US012638930B2

(12) United States Patent
Rivolta et al.

(10) Patent No.: US 12,638,930 B2
(45) Date of Patent: **\*May 26, 2026**

(54) SYSTEM AND METHOD FOR DETERMINING WHETHER AN ELECTRONIC DEVICE IS LOCATED ON A STATIONARY OR STABLE SURFACE

(71) Applicant: STMicroelectronics S.r.l., Agrate Brianza (IT)

(72) Inventors: Stefano Paolo Rivolta, Desio (IT); Federico Rizzardini, Settimo Milanese (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 0 days.

This patent is subject to a terminal disclaimer.

(21) Appl. No.: 18/944,811

(22) Filed: Nov. 12, 2024

(65) Prior Publication Data

US 2025/0068263 A1 Feb. 27, 2025

Related U.S. Application Data

(63) Continuation of application No. 18/048,360, filed on Oct. 20, 2022, now Pat. No. 12,175,024.

(51) Int. Cl.
$G06F\ 3/0346$ (2013.01)
$G06F\ 3/0354$ (2013.01)

(52) U.S. Cl.
CPC ........ *$G06F\ 3/0346$* (2013.01); *$G06F\ 3/03547$* (2013.01)

(58) Field of Classification Search
CPC .. G06F 3/0346; G06F 3/03547; G06F 1/1616; G06F 1/1626; G06F 1/1677;

(Continued)

(56) References Cited

U.S. PATENT DOCUMENTS 9,037,199 B1 5/2015 Stogaitis et al.
10,496,877 B2 12/2019 Dayal et al.
(Continued)

FOREIGN PATENT DOCUMENTS

CN 102159920 A 8/2011
CN 105009027 A 10/2015
(Continued)

OTHER PUBLICATIONS

European Search Report, Reference No. PA103784EP01, Application No. 23200099.2-1224, Applicant: STMicroelectronics S.r.l., Mar. 18, 2024, 10 pages.

(Continued)

*Primary Examiner* — Patrick N Edouard
*Assistant Examiner* — Joseph P Fox
(74) *Attorney, Agent, or Firm* — Slater Matsil, LLP

(57) ABSTRACT

A method includes receiving electrostatic sensor data in a processor of an electronic device from an electrostatic sensor mounted behind a touchscreen of the electronic device and using the electrostatic sensor data to determine when the touchscreen is being used. Based on whether or not the touchscreen is being used, an on-table detection (OTD) algorithm is selected from a plurality of available OTD algorithms. In one or more examples, the OTD algorithm may also be selected based on the current device mode of the electronic device, which may be determined from a lid angle, a screen angle, and a keyboard angle of the electronic device. The selected OTD algorithm is run to determine whether or not the electronic device is located on a stationary or stable surface.

20 Claims, 21 Drawing Sheets

(58) Field of Classification Search
CPC ...... G06F 1/1694; G06F 3/038; G06F 1/1643;
G06F 3/0418; G06F 3/0412; G01D 21/00
See application file for complete search history.

(56) References Cited

U.S. PATENT DOCUMENTS

| | | | |
|---|---|---|---|
| 10,671,186 B2 | 6/2020 | Ribeiro et al. | |
| 10,714,632 B2 | 7/2020 | Takechi et al. | |
| 10,791,445 B1 | 9/2020 | Schreib et al. | |
| 10,802,572 B2 | 10/2020 | Dayal et al. | |
| 11,099,208 B2 | 8/2021 | Rivolta et al. | |
| 11,327,100 B2 | 5/2022 | Fujiyoshi et al. | |
| 2010/0112743 A1 | 5/2010 | Kawauchi | |
| 2011/0172951 A1 | 7/2011 | Schlumbohm | |
| 2013/0002565 A1 | 1/2013 | Tumanov et al. | |
| 2015/0316383 A1 | 11/2015 | Donikian | |
| 2016/0147266 A1 | 5/2016 | Chng et al. | |
| 2016/0180429 A1* | 6/2016 | Anderson | G06Q 30/0625 705/16 |
| 2016/0188853 A1 | 6/2016 | Smith et al. | |
| 2017/0168595 A1 | 6/2017 | Sakaguchi et al. | |
| 2017/0231598 A1 | 8/2017 | Baek et al. | |
| 2017/0358181 A1 | 12/2017 | Moussette et al. | |
| 2018/0352073 A1 | 12/2018 | Horiguchi et al. | |
| 2019/0339770 A1* | 11/2019 | Kurlethimar | G02B 27/017 |
| 2020/0026365 A1 | 1/2020 | Rivolta et al. | |
| 2020/0110451 A1 | 4/2020 | He et al. | |
| 2020/0132717 A1 | 4/2020 | Rivolta et al. | |
| 2020/0133348 A1 | 4/2020 | Lin et al. | |
| 2021/0341512 A1 | 11/2021 | Rivolta et al. | |
| 2022/0035417 A1 | 2/2022 | Wang et al. | |

FOREIGN PATENT DOCUMENTS

| | | |
|---|---|---|
| CN | 106681478 A | 5/2017 |
| CN | 210721520 U | 6/2020 |

OTHER PUBLICATIONS

Groves, Paul D., "Principles of GNSS, Intertial, and Multisensor Integrated Navigation Systems," Second Edition, GNSS Technology and Applications Series, Chapter 6, IEEE Aerospace and Electronic Systems Magazine, Mar. 2013, 5 pages.

HP® Customer Suport, "HP Notebook PCs—HP CoolSense Technology," downloaded Aug. 2, 2022, https://support.hp.com/us-en/document/c02638953#AbT2, 4 pages.

Ruwer, Frederick J., et al., "Comparison of GPS and MEMS Support for Smartphone-Based Driver Behavior Monitoring," 2015 IEEE Symposium Series on Computational Intelligence, Dec. 2015, 8 pages.

Ramanandan, Arvind, et al., "Detection of Stationarity in an Inertial Navigation System," 23rd International Technical Meeting of the Satellite Division of the Institute of Navigation, Sep. 21-24, 2010, 7 pages.

Simon Konge Koldb, et al., "Improving MEMS Gyroscope Performance using Homogeneous Sensor Fusion," Master's Thesis, May 2011, 5 pages.

Zhongtang, Zhao, "Study on behavior identification method based on intelligent mobile terminal," Electronic Science and Technology University Press, Apr. 2015, Chapters 2 and 7, 5 pages.

* cited by examiner

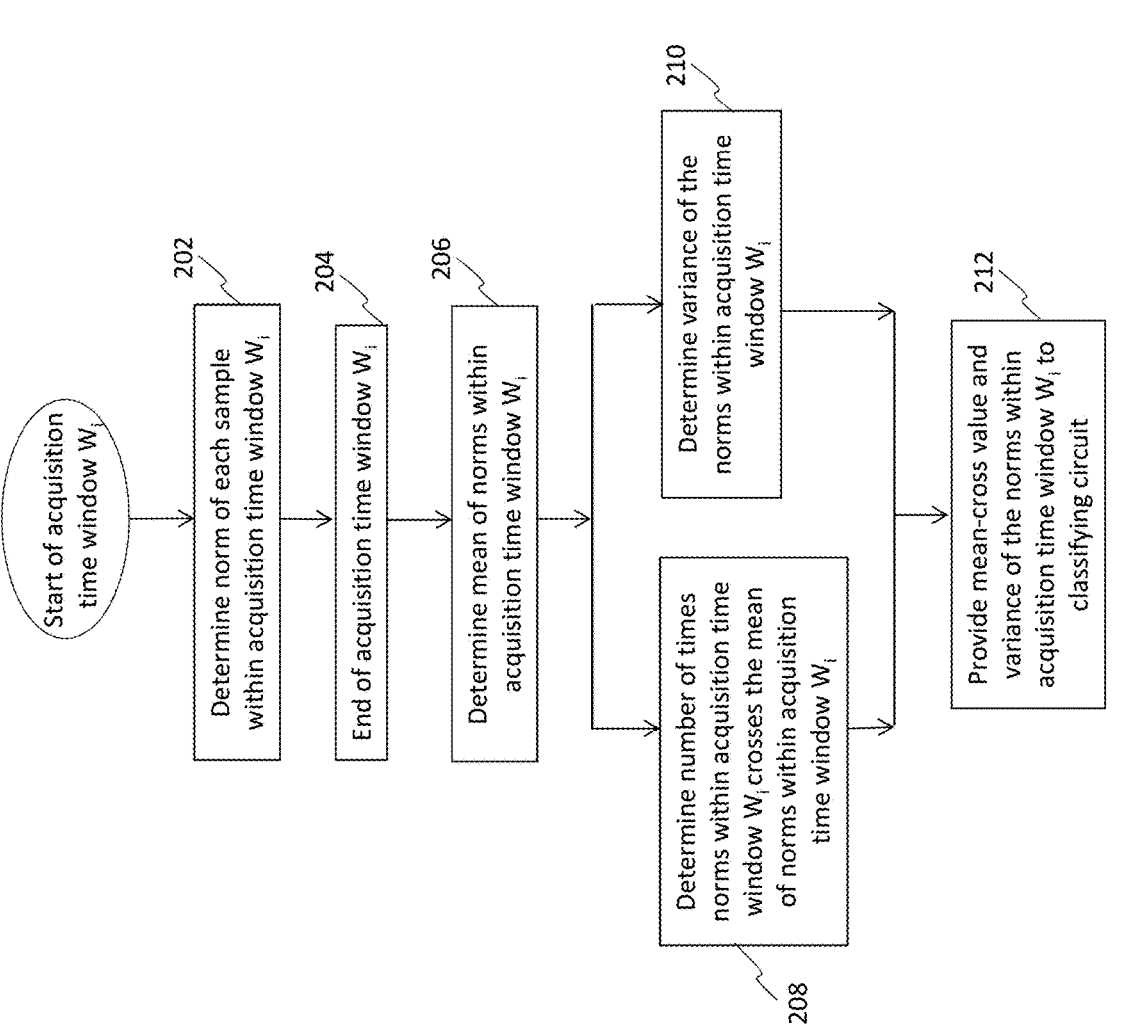

200

Start of acquisition time window $W_i$

Determine norm of each sample within acquisition time window $W_i$ — 202

End of acquisition time window $W_i$ — 204

Determine mean of norms within acquisition time window $W_i$ — 206

Determine number of times norms within acquisition time window $W_i$ crosses the mean of norms within acquisition time window $W_i$ — 208

Determine variance of the norms within acquisition time window $W_i$ — 210

Provide mean-cross value and variance of the norms within acquisition time window $W_i$ to classifying circuit — 212

FIG. 2

| DEVICE MODE | TOUCHSCREEN IN USE | |
| --- | --- | --- |
| | Yes | No |
| j = 0 (Clamshell) | OTD Algo. 0 | OTD Algo. 1 |
| j = 1 (Tent) | OTD Algo. 2 | OTD Algo. 3 |
| j = 2 (Stand) | OTD Algo. 4 | OTD Algo. 5 |
| ... | ... | ... |
| j = N (other) | OTD Algo. 2N | OTD Algo. 2N+1 |

1002 Receiving electrostatic sensor data in a processing unit of an electronic device 1004 Using the electrostatic sensor data to determine if the touchscreen is being used by a user 1006 Selecting one of the available OTD algorithms based on whether or not a touchscreen is being used 1008 Running the selected OTD algorithm

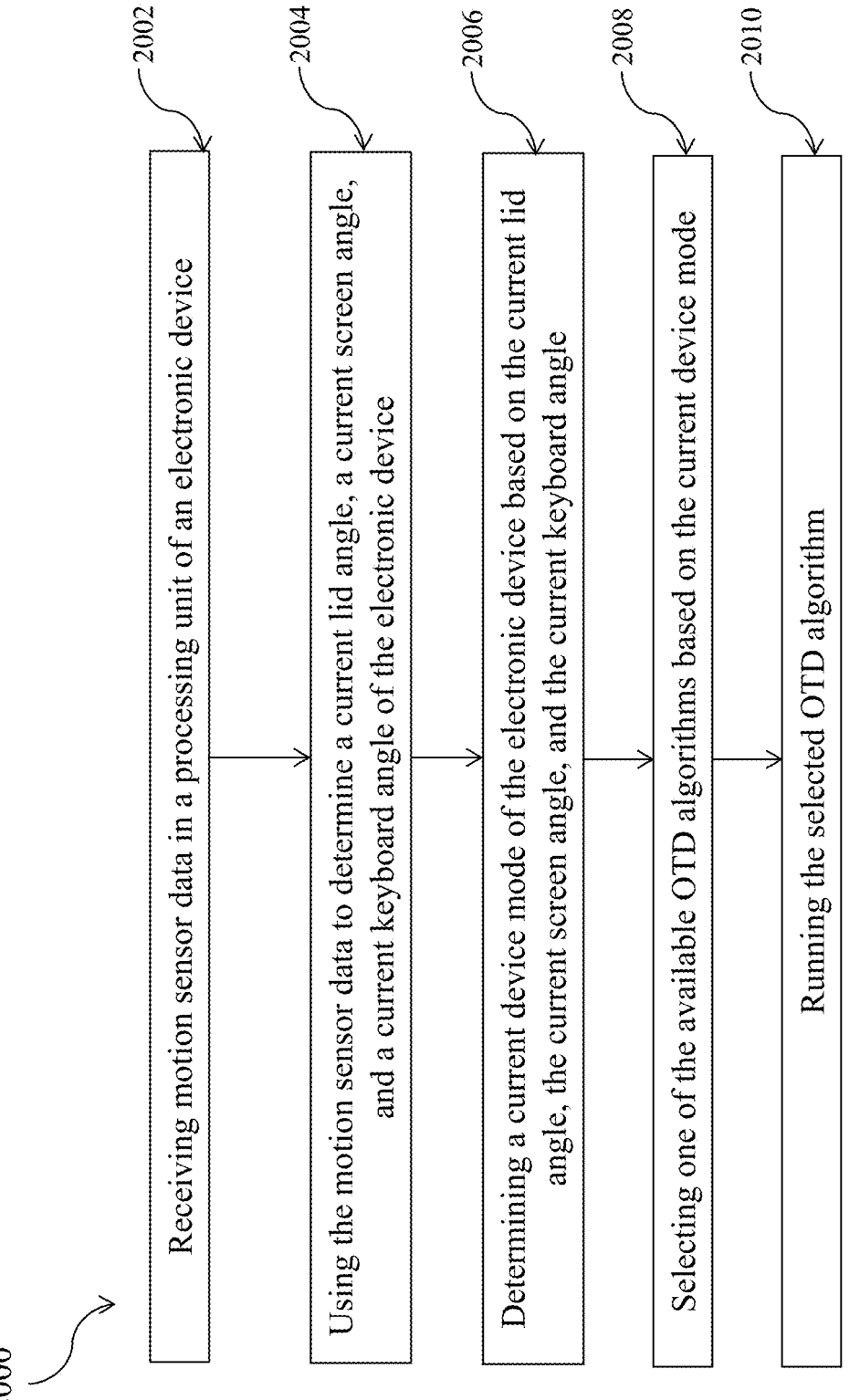

2000

2002 — Receiving motion sensor data in a processing unit of an electronic device 2004 — Using the motion sensor data to determine a current lid angle, a current screen angle, and a current keyboard angle of the electronic device 2006 — Determining a current device mode of the electronic device based on the current lid angle, the current screen angle, and the current keyboard angle 2008 — Selecting one of the available OTD algorithms based on the current device mode 2010 — Running the selected OTD algorithm

FIG. 13

SYSTEM AND METHOD FOR DETERMINING WHETHER AN ELECTRONIC DEVICE IS LOCATED ON A STATIONARY OR STABLE SURFACE

PRIORITY CLAIM AND CROSS-REFERENCE

This application is a continuation of U.S. patent application Ser. No. 18/048,360, entitled "System and Method for Determining Whether an Electronic Device is Located on a Stationary or Stable Surface," filed on Oct. 20, 2022, now U.S. Pat. No. 12,175,024 issued Dec. 24, 2024, which application is incorporated herein by reference.

TECHNICAL FIELD

The present disclosure relates generally to electronic devices, and, in particular embodiments, to a system and method for determining whether an electronic device is located on a stationary or stable surface.

BACKGROUND

As electronic devices become more ubiquitous and as individuals become more mobile, there is an increasing need to provide computing capabilities and information on the go. Such a need can be met, at least in part, by laptop computers, tablet devices, and wearable electronics (hereinafter individually and collectively referred to as an "electronic device").

One aspect that users often encounter with the use of an electronic device is high power consumption and/or poor heat dissipation, which often manifests as heating of the electronic device. Power supply components of the electronic device may be located on a bottom surface of the electronic device (e.g., the surface below the keyboard portion of a laptop computer). During long periods of use or during intense use (e.g., during gaming), the base of the electronic device can overheat, burn, or cause discomfort to the user if the electronic device is in physical contact with the user (e.g., the user's lap of wrist).

In addition to the potential of causing harm to human skin, elevated temperatures in the electronic device can detrimentally affect batteries that power the electronic device. While batteries can operate over a wide range of temperatures, charging or discharging the batteries while the electronic device is at an elevated temperature can reduce charge acceptance and reduce battery-life. For example, charging or discharging lithium polymer (LiPo) batteries at elevated temperatures can lead to gas generation that might cause a cylindrical cell to vent and a pouch cell to swell. Even further, elevated temperatures can detrimentally affect the lifetime of integrated circuits (e.g., provided on a printed circuit board (PCB) or implemented as silicon-on-chip (SoC)) in the electronic device, especially when such integrated circuits are subjected to prolonged durations of high operating temperatures.

In the past, heat sinks, fans, or holes could be used to funnel heat out of a body of the electronic device. However, as more functionality is added onto a PCB or into a SoC, heat is becoming a much more important consideration at the silicon level. Efficient ways of detecting whether or not the electronic device is located on a stationary or stable surface (e.g., a table or in a drawer) may be needed to optimize power consumption and/or heat dissipation of components within the electronic device.

SUMMARY

In accordance with an embodiment, a method includes: receiving electrostatic sensor data in a processor of an electronic device, the electrostatic sensor data being received from an electrostatic sensor mounted behind a touchscreen of the electronic device, the touchscreen being part of a screen panel of the electronic device; using the electrostatic sensor data to determine if the touchscreen is being used; based on whether or not the touchscreen is being used, selecting an on-table detection algorithm from a plurality of available on-table detection algorithms; and running the selected on-table detection algorithm, where the selected on-table detection algorithm determines whether or not the electronic device is located on a stationary or stable surface.

In accordance with another embodiment, a method includes: receiving motion sensor data in a processor of an electronic device, the motion sensor data being received from a first motion sensor and a second motion sensor, the first motion sensor being mounted in a screen panel of the electronic device, and the second motion sensor being mounted in a keyboard panel of the electronic device; using the motion sensor data to determine a current lid angle between the screen panel and the keyboard panel of the electronic device, a current screen angle between the screen panel and the vertical direction, and a current keyboard angle between the keyboard panel and the vertical direction; based on the current lid angle, the current screen angle, and the current keyboard angle, determining a current device mode of the electronic device; based on the current device mode, selecting an on-table detection algorithm from a plurality of available on-table detection algorithms; and running the selected on-table detection algorithm, where the selected on-table detection algorithm determines whether or not the electronic device is located on a stationary surface, and where the selected on-table detection algorithm is executed as program instructions in the first motion sensor.

In accordance with yet another embodiment, a system includes: a first motion sensor configured to generate first motion sensor data indicative of a first type of movement of an electronic device, the first motion sensor being mounted in a screen panel of the electronic device, the screen panel including an electrostatic sensor, the electrostatic sensor being configured to use a touchscreen of the screen panel as an electrode; and a processing unit coupled to the first motion sensor, the processing unit including: a non-transitory memory including a program; and a processor coupled to the non-transitory memory and configured to execute the program, the program including instructions to: determine a current activity of the touchscreen based on electrostatic sensor data received from the electrostatic sensor; and select an on-table detection algorithm to determine whether or not the electronic device is located on a stationary surface based on the first motion sensor data, where selecting the on-table detection algorithm is based on the current activity of the touchscreen.

It is to be understood that both the foregoing general description and the following detailed description are exemplary and explanatory only and are not restrictive of the disclosure, as claimed.

BRIEF DESCRIPTION OF THE DRAWINGS

For a more complete understanding of the present invention, and the advantages thereof, reference is now made to the following descriptions taken in conjunction with the accompanying drawings, in which:

FIG. 2 shows a method of extracting orientation-independent features from sensor data generated by a motion sensor of the electronic device of FIG. 1, in accordance with an embodiment;

FIG. 8 shows a table of various algorithms for determining if an electronic device is on a stationary or stable surface, in accordance with various embodiments;

FIG. 13 is a flowchart of another method for selecting an on-table detection algorithm, in accordance with some embodiments.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
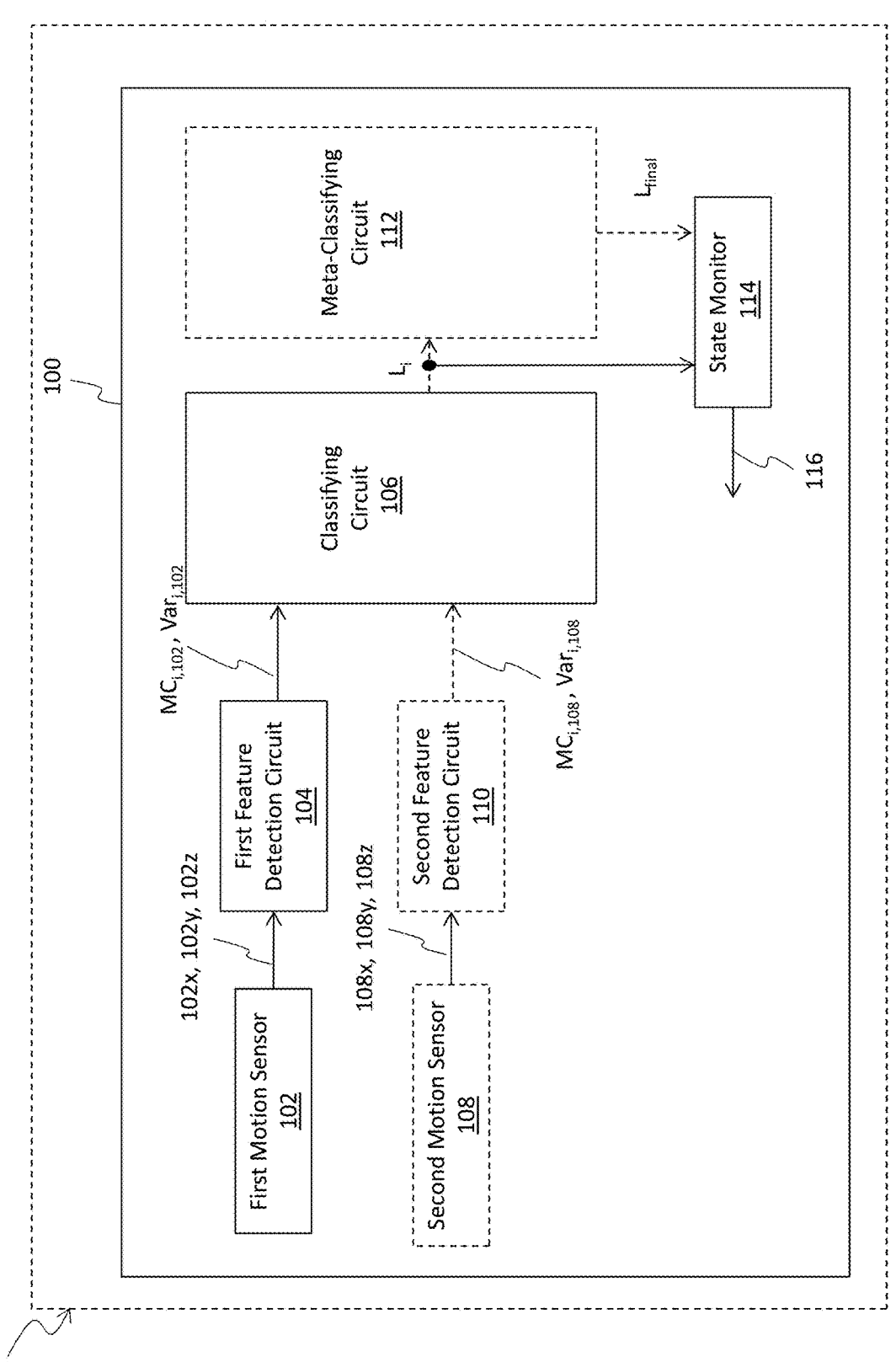
FIG. 1 shows a block diagram of an electronic device including a detection system, in accordance with an embodiment.

The making and using of various embodiments are discussed in detail below. It should be appreciated, however, that the various embodiments described herein are applicable in a wide variety of specific contexts. The specific embodiments discussed are merely illustrative of specific ways to make and use various embodiments, and should not be construed in a limited scope.

Various embodiments described herein are directed to efficient systems and methods for determining whether or not an electronic device is located on a stationary or stable surface (e.g., on a stationary or stable inanimate surface such as on a table or in a drawer). Such a determination may be used, for example, to optimize device performance, vary power consumption of the electronic device, and/or manage heat dissipation of components within the electronic device. As an illustration, in various embodiments, in response to a determination that the electronic device is on a stationary or stable surface (e.g., a table), fan speeds and clock frequencies of electronic components (e.g., of a central processing unit (CPU), a graphics processing unit (GPU), or a power supply unit) in the electronic device may be increased to achieve better performance (e.g., faster computation times); however, in response to a determination that the electronic device is not on a stationary or stable surface (e.g., when the electronic device is in motion or on a user's lap), clock frequencies of components in the electronic device may be decreased to reduce power consumption and to avoid overheating of the components in the electronic device. The determination that the electronic device is on a stationary or stable surface may also be used to change the power of an RF antenna of the device. For example, the power of the RF antenna may be reduced when the electronic device is not on a stationary or stable surface in order to protect the health of a user and increased when the electronic device is on a stationary or stable surface in order to achieve better performance.

At the outset, it is noted that the embodiments described below are directed to systems and methods of determining whether or not the electronic device is located on a stationary or stable surface. Use of the result of such a determination in the electronic device is given merely as illustration in the electronic device is given merely as illustrations, examples being to implement thermal policies, power savings, and performance benchmarks. The use of the result of such a determination in controlling or varying an operation of the electronic device may, in general, be left to the discretion of the manufacturer(s) of the electronic device and/or the manufacturer(s) of the electronic components of the electronic device.

As described below, the proposed methods use data from one or more motion sensors included in the electronic device. While conventional systems and methods of determining whether or not the electronic device is located on a stationary or stable surface may use data from one or more motion sensors, such conventional systems and methods may suffer from several disadvantages. For example, the motion sensors of the electronic device generate motion sensor data, and conventional systems and methods extract features from the motion sensor data that depend on an orientation of the motion sensor in the electronic device relative to a plurality of reference axes in order to determine whether or not the electronic device is located on a stationary or stable surface. In other words, conventional systems and methods rely on orientation-dependent features for the determination. Illustratively, conventional systems and methods may extract, from the motion sensor data, pitch, yaw, roll and/or various acceleration components relative to a calibrated coordinate system or the plurality of reference axes (e.g., three-dimensional coordinate system or a 6-axes system), with such orientation-dependent features being subsequently used to determine whether or not the electronic device is located on a stationary or stable surface.

Use of such orientation-dependent features requires calibration of the motion sensors of the electronic device to reduce sensor offset and bias (e.g., accelerometer offset and/or gyroscope bias). Calibration is also needed to generate the calibrated coordinate system or the plurality of reference axes, with such calibration ensuring that the orientation-dependent features (e.g., pitch, yaw, roll, x-axis acceleration component, y-axis acceleration component, and/or z-axis acceleration component) accurately track the motion and/or orientation of the electronic device. As a result of the use of orientation-dependent features, conventional systems and methods are not easily reconfigurable or re-tunable, can suffer from high latency and long convergence times (e.g., 10 seconds or more), and have limited accuracy since such conventional systems and methods are susceptible to device-to-device variations and orientation-based variations. Embodiment systems and methods aim to circumvent at least these disadvantages associated with conventional methods of determining whether or not the electronic device is located on a stationary or stable surface.

In general, embodiment systems and methods described herein extract a few (e.g., one or two) significant features from motion sensor data, and such extracted features are orientation-independent. Stated differently, the features extracted from motion sensor data are not dependent on a calibrated coordinate system or a plurality of reference axes for accuracy. In particular, embodiment systems and methods rely on a mean-cross value (explained in greater detail below) and a variance of the norm of the motion sensor data within each acquisition time window, which features are orientation-independent. Furthermore, embodiment systems and methods analyze the mean-cross value and the variance of the norm using a machine learning approach to determine whether or not the electronic device is located on a stationary or stable surface. Additionally, embodiment systems and methods use physical sensor data without the need of complex processing methods (examples of such methods being sensor fusion for attitude estimation, calibration, FFT, and complex filtering chains). Due to the use of orientation-independent features, a machine learning approach, and physical sensor data, the embodiment systems and methods have at least the following advantages: (1) are easily tuned or reconfigured; (2) have low latency and short convergence times (e.g., less than 10 seconds); (3) do not require calibration of the motion sensors (thereby exhibiting immunity against device-to-device variations, accelerometer offsets, and/or gyroscope bias); and (4) have greater reliability compared to conventional systems and methods since orientation-independent features are used instead of orientation-dependent features.

Embodiment systems and methods may operate in laptops and related convertible electronic devices (e.g., tablets with laptop modes or the like) that include touchscreens and can be used in different modalities or device modes. The different device modes may include different orientations of the screen panel and keyboard panel of the electronic device with respect to each other, such as lid closed mode, clamshell mode, flat mode, tent mode, stand mode, tablet mode, and book mode. Motion sensors may be mounted on the screen panel of the electronic devices, behind the touchscreen. Touchscreen operation by the user can cause interference with the motion sensors, leading to less accurate determination of whether or not the electronic device is located on a stationary or stable surface. Different algorithms for determining if the electronic device is located on a stationary or stable surface (also referred to as On-Table Detection (OTD) algorithms) may be employed for each combination of device mode with whether or not the touchscreen is detected to be in use. Touchscreen usage can be detected by using an electrostatic sensor which may be included in the motion sensors or in the screen panel. This allows algorithms to detect entering or exiting a touchscreen use state without querying the touchscreen controller, which is useful for improving accuracy of the determination if the electronic device is located on a stationary or stable surface.

Embodiments of the disclosure are described in the context of the accompanying drawings. An embodiment of an electronic device including a detection system will be described using FIG. 1. An embodiment of a method of extracting orientation-independent features from sensor data generated by a motion sensor of the electronic device of FIG. 1 will be described using FIG. 2. An embodiment of sensor data generated by a motion sensor of the electronic device of FIG. 1 will be described using FIGS. 3A-3D. An embodiment of mean-cross values generated by different motion sensors of the electronic device of FIG. 1 for different states will be described using FIGS. 4A-4B. An embodiment of relative differences between mean-cross values and variances for different states will be described using FIGS. 5A-5B. Embodiments of various ways of implementing the detection system of FIG. 1 and the method of FIG. 2 will be described using FIGS. 6A-6C. Embodiments of various device modes for electronic devices will be described using FIGS. 7A-7G. Embodiments of various algorithms for determining if an electronic device is on a stationary or stable surface will be described using FIG. 8. Various embodiments of using an electrostatic sensor to measure operation of a touchscreen will be described using FIGS. 9A to 9C. An embodiment of a touch detection algorithm for a touchscreen will be described using FIG. 10. An embodiment of an on-table detection selector algorithm will be described using FIG. 11. Embodiments of methods for selecting on-table detection algorithms will be described using FIGS. 12 and 13.

FIG. 1 shows a block diagram of an electronic device 101 including a detection system 100, in accordance with an embodiment. The detection system 100 may be within, attached, or coupled to the electronic device 101. The detection system 100 of the electronic device 101 may be used to determine whether or not the electronic device 101 is on a stationary or stable surface (e.g., on a table or in a drawer). As mentioned above, the electronic device 101 may be a laptop computer, a tablet device, or a wearable electronic device (e.g., a smart watch, mobile phone, wireless headphones, or the like). The detection system 100 includes a first motion sensor 102 and a first feature detection circuit 104 that is coupled to an output of the first motion sensor 102. The first feature detection circuit 104 is configured to determine one or more orientation-independent features from the output signal of the first motion sensor 102.

As shown in FIG. 1, a classifying circuit 106 is coupled to an output of the first feature detection circuit 104. The classifying circuit 106 is configured to determine a state of the electronic device 101 (e.g., assign a label indicating whether or not the electronic device 101 is located on a stationary or stable surface). Such a determination by the classifying circuit 106 is based on the orientation-independent features determined by the first feature detection circuit 104.

In some embodiments, the detection system 100 may further include a second motion sensor 108 that measures a different motion characteristic compared to the first motion sensor 102. In such embodiments, a second feature detection circuit 110 may be coupled to an output of the second motion sensor 108. Similar to the first feature detection circuit 104, the second feature detection circuit 110 is configured to determine one or more orientation-independent features from the output signal of the second motion sensor 108.

In embodiments including the second motion sensor 108, the classifying circuit 106 is configured to determine a state of the electronic device 101 (e.g., assign a label indicating whether or not the electronic device 101 is located on a stationary or stable surface), with such determination being based on the orientation-independent features determined by the first feature detection circuit 104 and the orientation-independent features determined by the second feature detection circuit 110.

In some embodiments, the detection system 100 may further include a meta-classifying circuit 112 coupled to an output of the classifying circuit 106. The meta-classifying circuit 112 may implement a time-based voting method that acts as a low-pass filter on the output of the classifying circuit 106 in order to improve an overall accuracy of the detection system 100. Each of the components of the detection system 100 is described in further detail below.

The detection system 100 includes the first motion sensor 102, which may be an accelerometer of the electronic device 101. It is noted that although only one first motion sensor 102 is shown in FIG. 1, a plurality of first motion sensors 102 may be included in the electronic device 101 (e.g., two or more accelerometers placed at different locations of the electronic device 101). The electronic device 101 having the first motion sensor 102 may be a laptop computer having an accelerometer coupled or attached to a base of the laptop computer. As another example, the electronic device 101 having the first motion sensor 102 may be a tablet having an accelerometer included within the tablet. The first motion sensor 102 may be configured to sense vibration or acceleration of the electronic device 101 in each axis of motion. For example, the first motion sensor 102 may generate first sensor data 102x, 102y, 102z that is indicative of vibration or acceleration of the electronic device 101 in the lateral axis (e.g., referred to as the "x axis"), longitudinal axis (e.g., referred to as the "y axis"), and vertical or normal axis (e.g., referred to as the "z axis"), respectively.

As will be clear in the description below, use of the first sensor data 102x, 102y, 102z from the first motion sensor 102 enables the embodiment system and methods to determine whether or not the electronic device 101 is located on a stationary or stable surface. However, in other embodiments, detection can be improved with the use of the second motion sensor 108 in conjunction with the first motion sensor 102. The second motion sensor 108 may be a gyroscope of the electronic device 101. It is reiterated that use of the second motion sensor 108 (and consequently, the data generated by the second motion sensor 108) is optional. For example, in low-power or low-cost implementations of the embodiment systems and methods, the second motion sensor 108 (e.g., gyroscope) and the data therefrom may not be present or used by the classifying circuit 106 to determine whether or not the electronic device 101 is located on a stationary or stable surface (e.g., on a table or in a drawer). The second motion sensor 108 may be configured to measure a rate at which the electronic device 101 rotates around each axis of motion. For example, the second motion sensor 108 may generate second sensor data 108x, 108y, 108z that is indicative of the rotation rate of the electronic device 101 around the x-axis, the y-axis, and the z-axis, respectively.

It is noted that the first sensor data 102x, 102y, 102z and the second sensor data 108x, 108y, 108z respectively generated by the first motion sensor 102 and the second motion sensor 108 may depend, at least in part, on a placement or orientation of the electronic device 101. As an illustration, the electronic device 101 may be placed in an inclined plane, a flat plane, on a part of the human body (e.g., a lap), or on an inanimate object (e.g., a desk). The first sensor data 102x, 102y, 102z and the second sensor data 108x, 108y, 108z may be indicative of such a placement or orientation of the electronic device 101. Furthermore, while the first feature detection circuit 104 and the second feature detection circuit 110 are shown as separate circuits in FIG. 1, it is noted that in some embodiments, a single detection circuit may implement both the first feature detection circuit 104 and the second feature detection circuit 110.

FIG. 2 shows an embodiment method 200 that may be executed by the first feature detection circuit 104 to extract or determine orientation-independent features from the first sensor data 102x, 102y, 102z. The method 200 may also be executed by the second feature detection circuit 110 to extract or determine orientation-independent features from the second sensor data 108x, 108y, 108z, in other embodiments that optionally utilize the second motion sensor 108 (e.g., gyroscope) in addition to the first motion sensor 102 (e.g., accelerometer). The description that follows is directed to examples where the first feature detection circuit 104 executes the method 200; however, such description applies equally to the second feature detection circuit 110 in other embodiments that optionally utilize the second motion sensor 108 in addition to the first motion sensor 102.

Figure 3A:
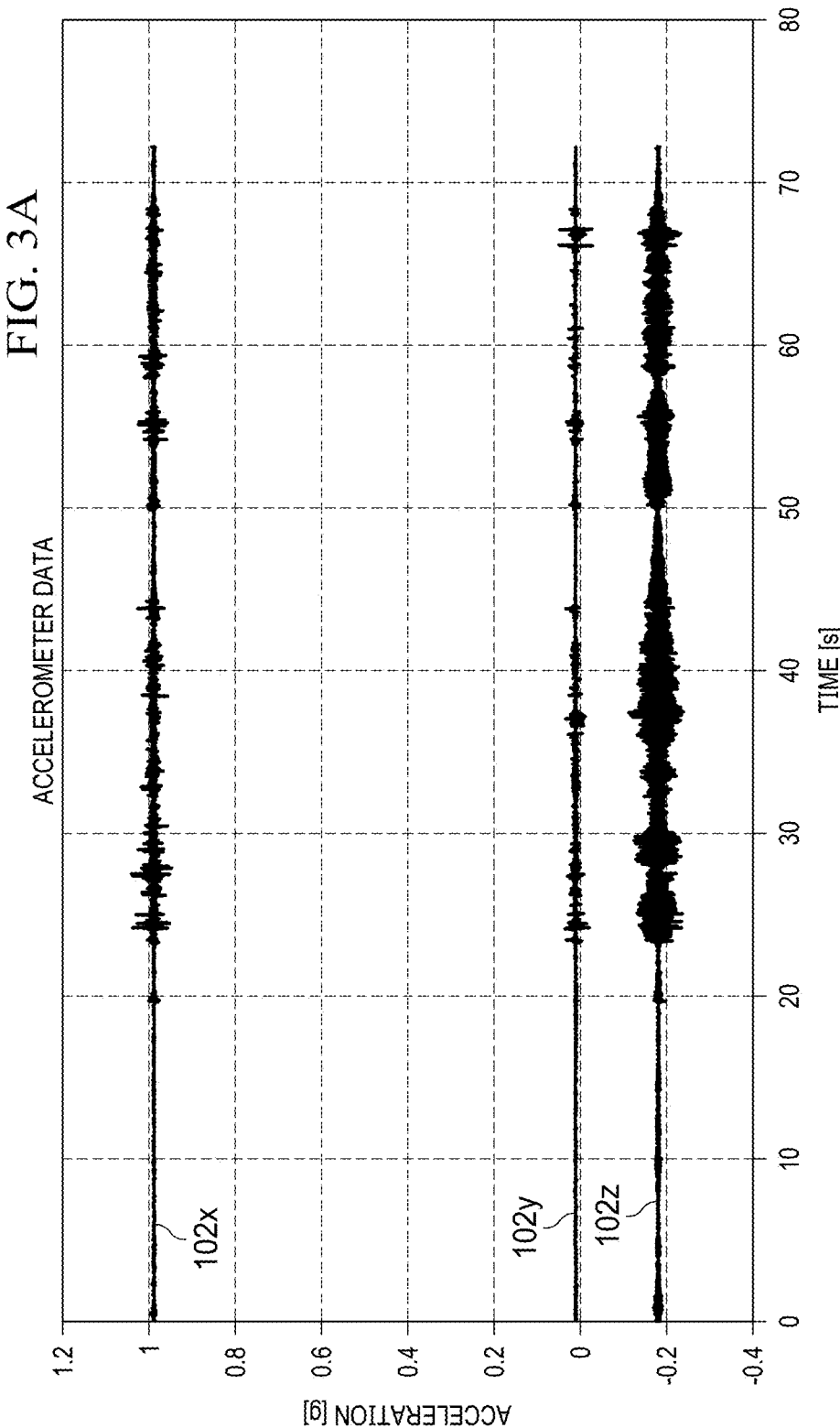
FIG. 3A shows sensor data generated by a motion sensor of the electronic device of FIG. 1, in accordance with an embodiment.
Figure 3B:
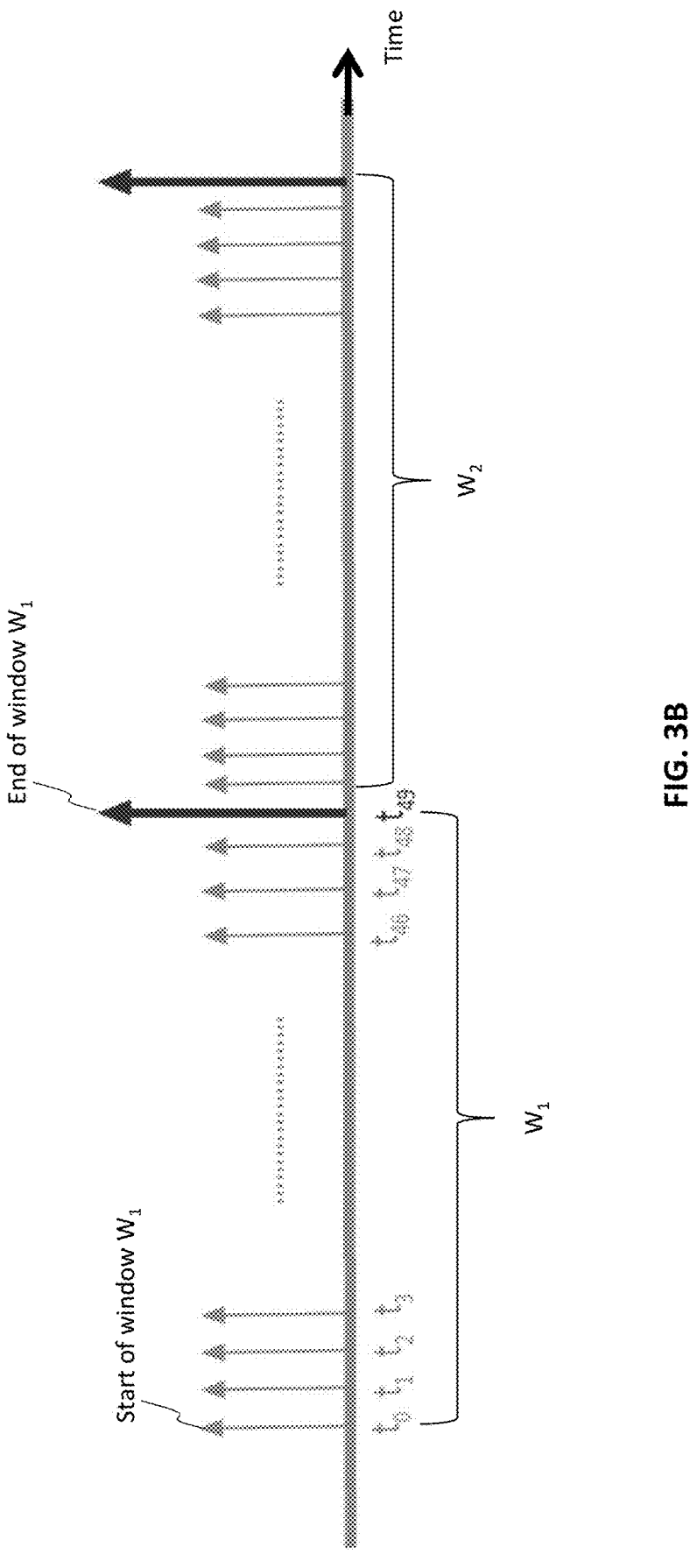
FIG. 3B shows a zoomed-in view of sampling times of first and second acquisition time windows of the sensor data of FIG. 3A, in accordance with an embodiment.
Figure 3C:
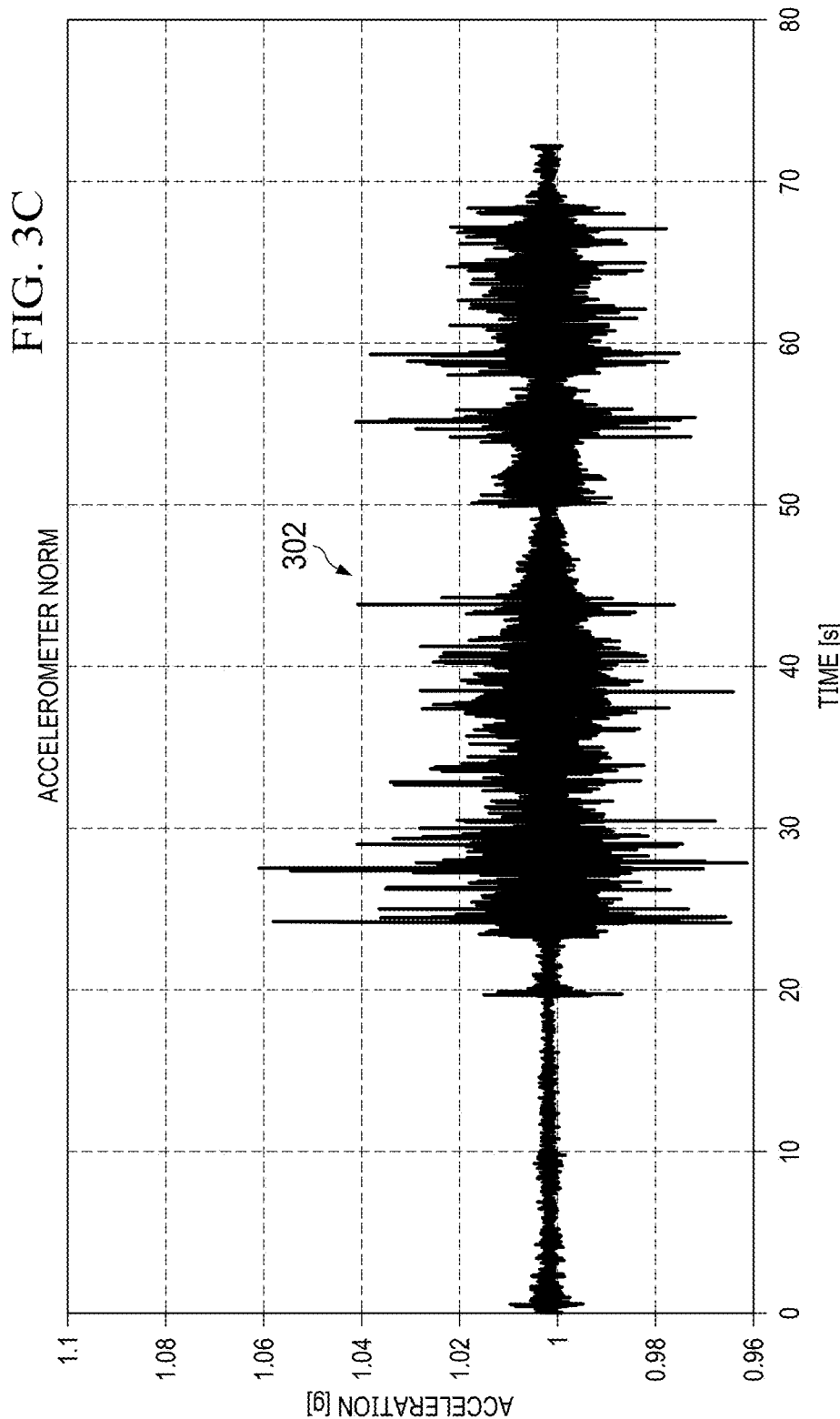
FIG. 3C shows the norm of the sensor data of FIG. 3A, in accordance with an embodiment.

Prior to discussing the details of method 200 in FIG. 2, a brief discussion of acquisition time windows is provided with reference to FIGS. 3A and 3B. FIG. 3A shows an example of the first sensor data 102x, 102y, 102z that is generated by the first motion sensor 102 over a plurality of acquisition time windows. FIG. 3B shows a zoomed-in view of sampling times of the first two acquisition time windows W1, W2 of the example of FIG. 3A. As illustrated in FIG. 3B, the plurality of acquisition time windows are consecutive and non-overlapping windows of time in some embodiments. However, in other embodiments, overlapping windows of time are also possible. In the example of FIG. 3B, the first acquisition time window W1 starts at time $t_0$ and ends at time t49. In an embodiment, such as in the examples of FIGS. 3A and 3B, each acquisition time window has a duration of 1 second and includes 50 samples (e.g., corresponding to a 50 Hz sampling frequency). Consequently, in the example of FIG. 3A, there are about 72 acquisition time windows and a total about 3600 samples (i.e., 50 samples for each of the 72 acquisition time windows). It is noted that each sample includes a complete dataset (e.g., x-axis data, y-axis data, and z-axis data). It is also noted that the 50 Hz sampling frequency and the 1 second duration for each acquisition time window are merely examples, and other embodiments are envisioned where different sampling frequencies and different time durations are used. FIG. 3C shows the norm 302 of the first sensor data 102x, 102y, 102z in FIG. 3A, and the norm 302 at a given sample time may be indicative of the magnitude of the first sensor data 102x, 102y, 102z at the given sample time.

The method 200 is executed for each acquisition time window $W_i$. As shown in FIG. 2, method 200 is triggered at the start of acquisition time window $W_i$ (e.g., time $t_o$ in FIG. 3B) and includes step 202, where the first feature detection circuit 104 receives the first sensor data 102x, 102y, 102z and determines the norm of each sample within the acquisition time window $W_i$. In some embodiments, the norm of each sample within the acquisition time window $W_i$ is stored in a buffer included in the first detection circuit 104, although in other embodiments, the computation technique used to determine the norm may obviate the need for such a buffer.

In step 204, the acquisition time window $W_i$ ends and the method 200 proceeds to step 206 where the mean of the norms within the acquisition time window $W_i$ are determined. In steps 208 and 210, statistical data is extracted from the norms within the acquisition time window $W_i$. Consequently, steps 206, 208 and 210 are triggered each time an entire window of samples is acquired (e.g., each time 50 samples are acquired in a 1 second time window). The statistical data includes the mean-cross value within the acquisition time window $W_i$ (in step 208) and the variance of the norms within the acquisition time window $W_i$ (in step 210), both of which require the mean of the norms determined in step 206.

Figure 3D:
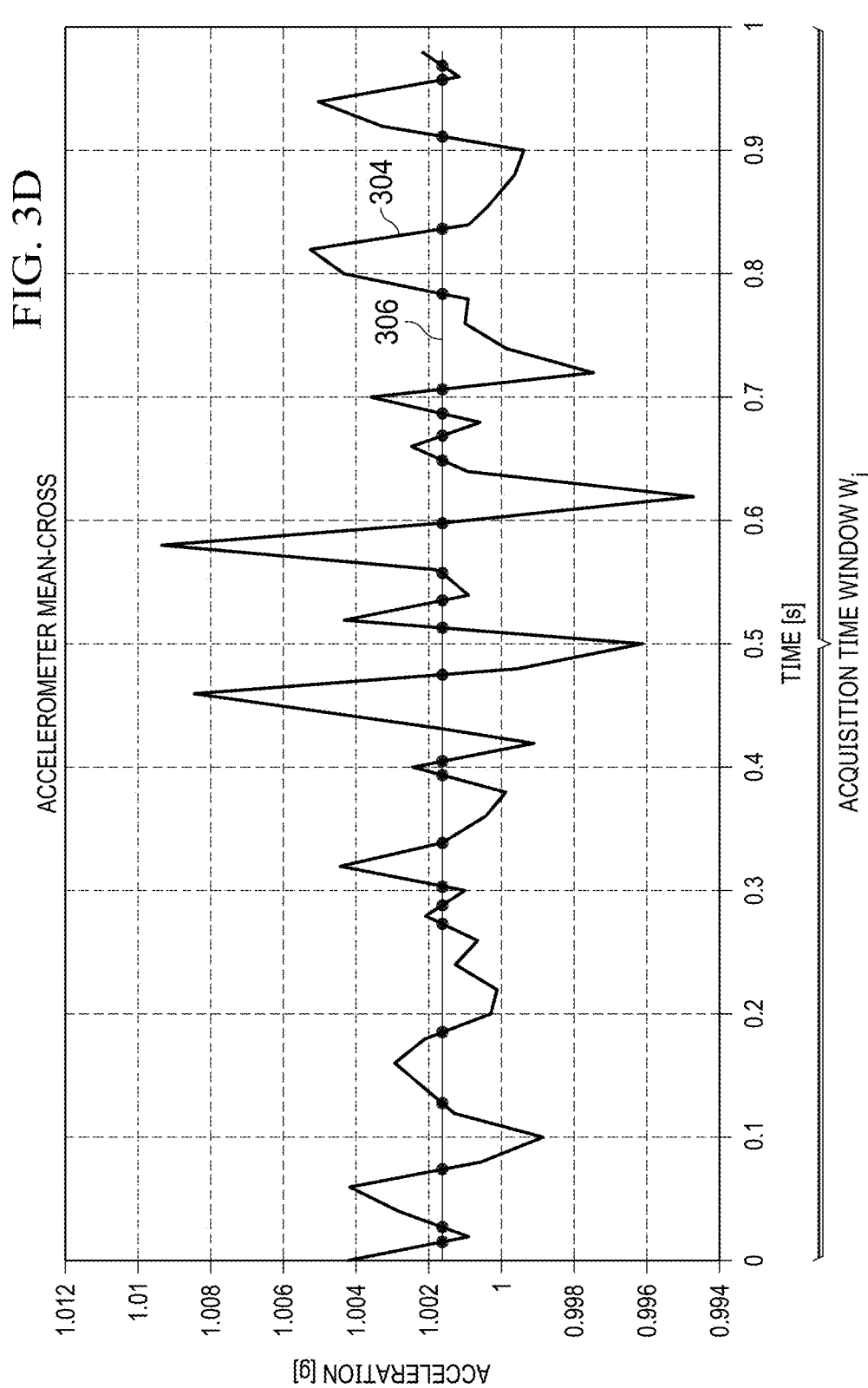
FIG. 3D shows the norm of the sensor data of FIG. 3A within the first acquisition time window of the sensor data of FIG. 3A, in accordance with an embodiment.

With reference to step 208, the mean-cross value denotes the number of times the norms within the acquisition time window $W_i$ crosses the mean of the norms within the acquisition time window $W_i$. An illustration is given in FIG. 3D, which shows the norms 304 within the acquisition time window $W_i$ (e.g., determined in step 202) and the mean 306 of the norms within the acquisition time window $W_i$ (e.g., determined in step 206). In the example of FIG. 3D, there are 26 times when the norms 304 within the acquisition time window $W_i$ crosses the mean 306 of the norms within the acquisition time window $W_i$. These instances are depicted as points of intersection of the curve 304 and the line 306. Consequently, the mean-cross value for the example of FIG. 3D is 26.

With reference to step 210, the variance of the norm within the acquisition time window $W_i$ is determined as follows:

$$\text{variance} = \frac{\sum_1^n (x_i - x_{mean})^2}{n-1}$$

where n is the number of samples within the acquisition time window $W_i$ (e.g., 50 in the case of a 50 Hz sampling frequency), xi is the $i^{th}$ norm 304 within the acquisition time window $W_i$, and $x_{mean}$ is the mean of the norms 306 within the acquisition time window $W_i$.

At step 212 of method 200, the mean-cross value and the variance of the norms within the acquisition time window $W_i$ is provided to the classifying circuit 106. As such, the classifying circuit 106 is run after the acquisition time window $W_i$ ends and after the mean-cross value and the variance of the norms within the acquisition time window $W_i$ are determined by the appropriate detection circuit. It is once again noted that the mean-cross value and the variance of the norms within the acquisition time window $W_i$ are the orientation-independent features that are used to determine whether or not the electronic device 101 is located on a stationary or stable surface.

Figure 4A:
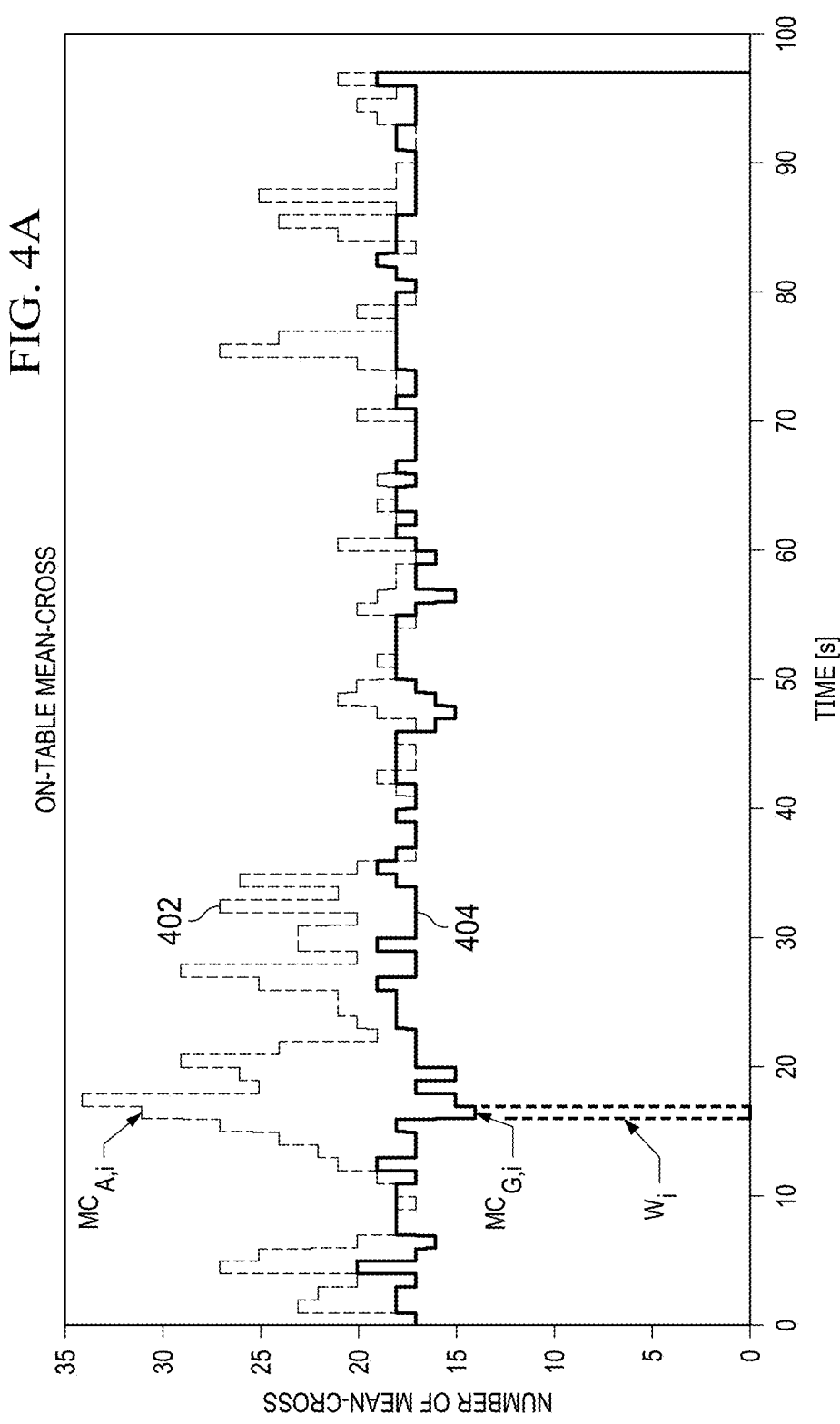
FIGS. 4A and 4B show mean-cross values generated by different motion sensors of the electronic device of FIG. 1 for different states, in accordance with an embodiment.
Figure 4B:
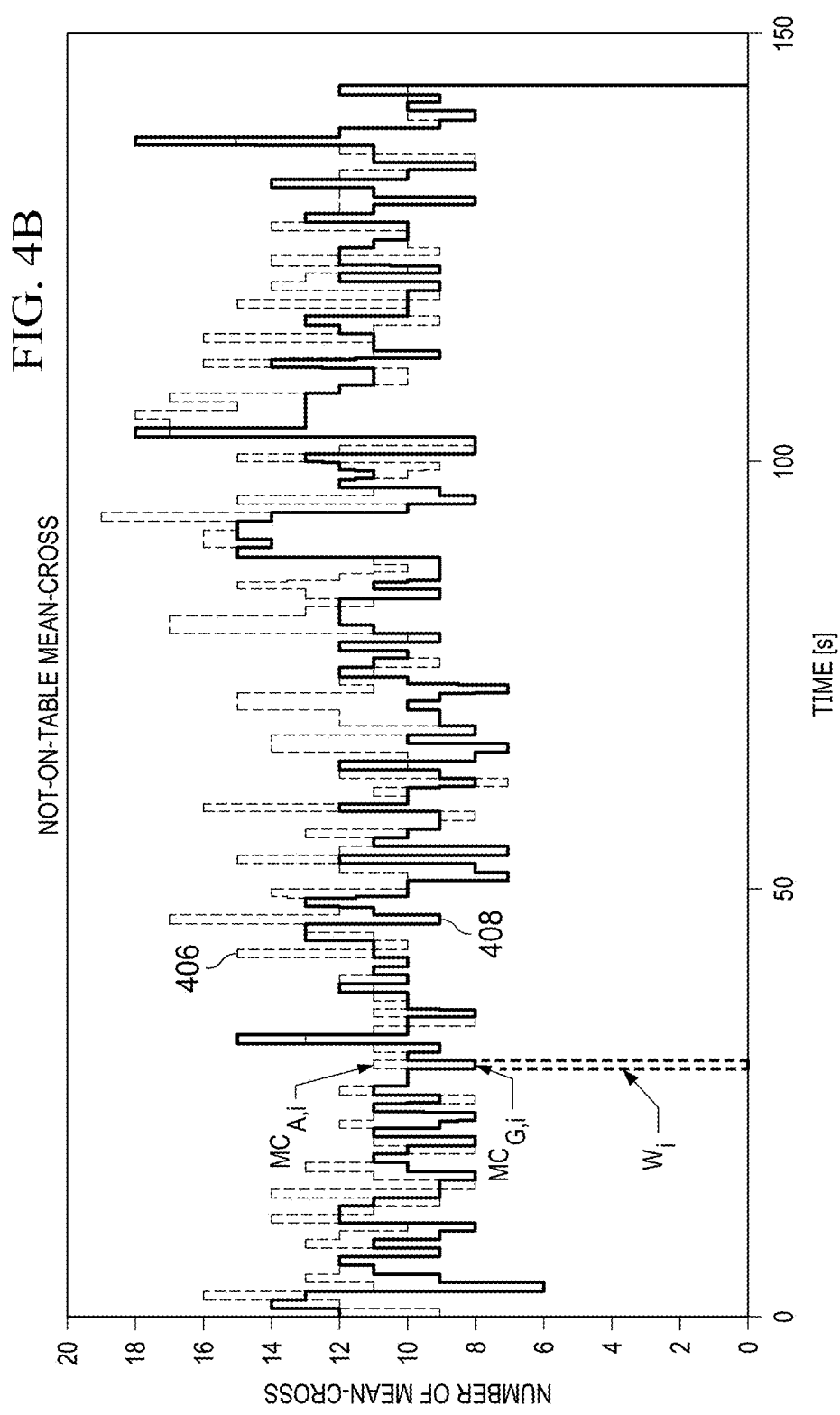

FIG. 4A shows mean-cross values 402 generated by the first feature detection circuit 104 and mean-cross values 404 generated by the second feature detection circuit 110 over 96 acquisition time windows $W_i$ in a scenario where the electronic device 101 is located on a stationary or stable surface (e.g., a table). Consequently, each acquisition time windows $W_i$ in FIG. 4A has a respective mean-cross value $MC_{A,i}$ associated with the first motion sensor 102 (e.g., accelerometer) and a respective mean-cross value $MC_{G,i}$ associated with the second motion sensor 108 (e.g., gyroscope). FIG. 4B shows mean-cross values 406 generated by the first feature detection circuit 104 and mean-cross values 408 generated by the second feature detection circuit 110 over 145 acquisition time windows $W_i$ in a scenario where the electronic device 101 is not located on a stationary or stable surface (e.g., when on a human lap). Consequently, each time window t; in the example of FIG. 4B has a respective mean-cross value $MC_{A,i}$ associated with the first motion sensor 102 (e.g., accelerometer) and a respective mean-cross value $MC_{G,i}$ associated with the second motion sensor 108 (e.g., gyroscope).

Figure 5A:
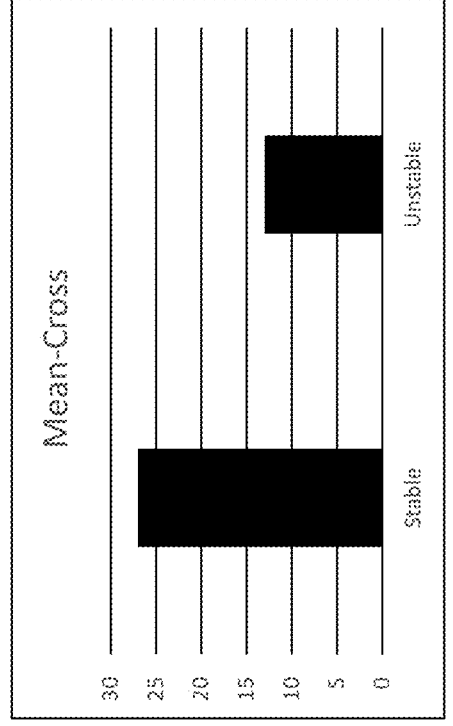
FIGS. 5A and 5B show relative differences between mean-cross values and variances for different states, in accordance with an embodiment.

As can be observed by comparing the mean-cross values 402 and 406 of FIGS. 4A and 4B, respectively, it has been observed through experiments that the mean-cross values 402 obtained by method 200 when the electronic device 101 is located on a stationary or stable surface (e.g., when on a table) is expected to be greater than the mean-cross values 406 obtained by method 200 when the electronic device 101 is not located on a stationary or stable surface (e.g., when on a human lap). This relative difference in the mean-cross values in the two different states is depicted in FIG. 5A and can be explained in terms of the contribution of white noise of the first motion sensor 102 to the first sensor data 102$x$, 102$y$, 102$z$ in the two states, namely: (1) when the electronic device 101 is located on a stationary or stable surface, and (2) when the electronic device 101 is not located on a stationary or stable surface.

For example, the first sensor data 102$x$, 102$y$, 102$z$ from the first motion sensor 102 can be approximated as white noise of the first motion sensor 102 added with motion-dependent signals. The white noise of the first motion sensor 102 can be approximated as a signal that causes the first sensor data 102$x$, 102$y$, 102$z$ to fluctuate frequently and randomly around its mean value when the motion-dependent signals are stable and slowly varying (e.g., when on a stationary or stable surface). Comparatively, white noise of the first motion sensor 102 has less of a contribution on the first sensor data 102$x$, 102$y$, 102$z$ when the motion-dependent signals are dominant (e.g., when not on a stationary or stable surface). As a result, the mean-cross values 402 when the electronic device 101 is located on a stationary or stable surface is expected to be greater than the mean-cross values 406 when the electronic device 101 is not located on a stationary or stable surface.

In a similar manner, it can be observed from FIGS. 4A and 4B that the mean-cross values 404 obtained by method 200 when the electronic device 101 is located on a stationary or stable surface (e.g., when on a table) is greater than the mean-cross values 408 obtained by method 200 when the electronic device 101 is not located on a stationary or stable surface (e.g., when on a human lap). This difference in the mean-cross values for the two difference states can also be explained in terms of the contribution of white noise of the second motion sensor 108 to the second sensor data 108$x$, 108$y$, 108$z$ in the two states, as described above.

Figure 5B:
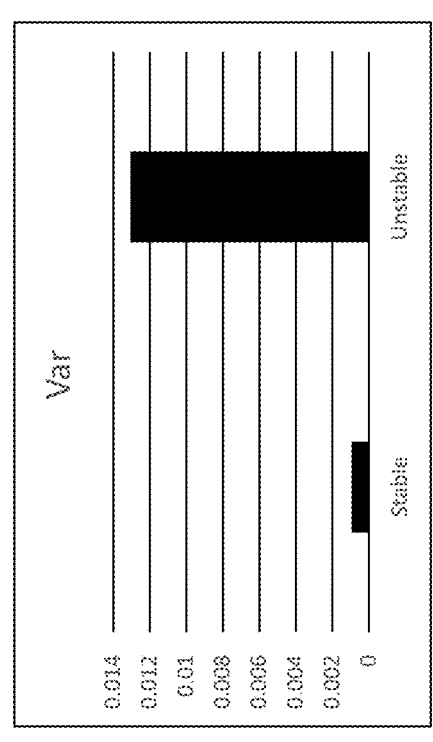

With regards to the variance of the norm, it has been observed through experiments that the variance of the norms when the electronic device 101 is located on a stationary or stable surface is expected to be smaller than the variance of the norms when the electronic device 101 is not located on a stationary or stable surface. This relative difference in the variance of the norms in the two different states is depicted in FIG. 5B.

Moving on to the classifying circuit 106, as noted above, the classifying circuit 106 is run after the acquisition time window $W_i$ ends and after it has received the mean-cross value and the variance of the norms for the acquisition time window $W_i$. The classifying circuit 106 may be configured to determine whether or not the electronic device 101 is located on a stationary or stable surface during the acquisition time window $W_i$ based on at least the mean-cross value and the variance of the norms for each acquisition time window $W_i$. The classifying circuit 106 may be a supervised machine learning classifier implemented using machine learning techniques, examples being logistic regression, naive Bayes classifier, support vector machines, decision trees, boosted trees, random forest, neural networks, nearest neighbor, among others. The classifying circuit 106 is configured to assign a label (or decision) Li to each acquisition time window $W_i$, with such label Li indicating whether or not the electronic device 101 is located on a stationary or stable surface during the acquisition time window $W_i$. The usage of the variance of the norm can increase the accuracy of the classifying circuit 106, with the variance of the norm decreasing if the electronic device 101 is located on a stationary or stable surface, and the variance of the norm increasing if the electronic device 101 is not located on a stationary or stable surface.

It is noted that supervised learning is a machine learning task of learning a function that maps an input to an output based on example input-output pairs. In particular, supervised learning infers a function from labeled training data including a set of training examples. In the supervised machine learning classifier of classifying circuit 106, labeled training data may be obtained by placing the electronic device 101 (including the first motion sensor 102 and, optionally, the second motion sensor 108) on a stationary or stable surface (e.g., a table) and logging the first sensor data $102x$, $102y$, $102z$ and the second sensor data $108x$, $108y$, $108z$ for various typing intensity levels and different orientations and positions of the electronic device 101 on the stationary or stable surface. The first sensor data $102x$, $102y$, $102z$ and the second sensor data $108x$, $108y$, $108z$ for these various typing intensity levels and different orientations and positions are known to have been obtained when the electronic device 101 is located on a stationary or stable surface. Consequently, such first sensor data $102x$, $102y$, $102z$ and second sensor data $108x$, $108y$, $108z$ are then subjected to the method 200 of FIG. 2 to obtain mean-cross values and variance of norms values for various acquisition time windows $W_i$, and such mean-cross values and variance of norms values are subsequently assigned the label indicating that the electronic device 101 is located on a stationary or stable surface.

Similarly, labeled training data may also be obtained by placing the electronic device 101 on a moving or unstable surface (e.g., a human lap) and logging the first sensor data $102x$, $102y$, $102z$ and the second sensor data $108x$, $108y$, $108z$ for various typing intensity levels and different orientations and positions of the electronic device 101 on the stationary or stable surface. The various first sensor data $102x$, $102y$, $102z$ and the various second sensor data $108x$, $108y$, $108z$ obtained in such a manner are then subjected to the method 200 of FIG. 2 to obtain mean-cross values and variance of norms values for various acquisition time windows $W_i$, and such mean-cross values and variance of norms values are subsequently assigned the label indicating that the electronic device 101 is not located on a stationary or stable surface.

Latency of the detection system 100 shown in FIG. 1 may depend on at least the latency of the classifying circuit 106, which may be equal to the duration of each of the acquisition time windows $W_i$. In an embodiment where the duration of each acquisition time window $W_i$ is 1 second, the classifying circuit 106 has a latency of 1 second since a label Li is output from the classifying circuit 106 every second. As will be described below, in embodiments that also include the meta-classifying circuit 112, the latency of the detection system 100 is also affected by the meta-classifier output latency.

To further enhance the accuracy of the determination of whether or not the electronic device 101 is located on a stationary or stable surface, the detection system 100 may include the meta-classifying circuit 112. In an embodiment, the meta-classifying circuit 112 is configured to determine the number of consecutive occurrences of the output Li of the classifying circuit 106. If the number of consecutive occurrences overcomes a threshold, the output of the meta-classifying circuit 112 (labelled $L_{final}$ in FIG. 1) is changed. Otherwise, the previous state is kept. As such, the meta-classifying circuit 112 can be used to low-pass filter the output of the classifying circuit 106 (e.g., to avoid glitches and spurious false positives).

Use of the meta-classifying circuit 112 introduces latency to the detection system 100, and the latency of the meta-classifying circuit 112 can be configured to be a minimum of N times the duration of an acquisition time window $W_i$. In some embodiments, different minimum latencies may be applicable depending on whether the output of the classifying circuit 106 indicates that the electronic device 101 is located on a stationary or stable surface (e.g., where $N=N_{on\_table}$ and the output state $L_{final}$ is changed if the number of consecutive occurrences reaches $N_{on\_table}$) or whether the output of the classifying circuit 106 indicates that the electronic device 101 is not located on a station or stable surface (e.g., where $N=N_{not\_on\_table}$ and the output state $L_{final}$ is changed if the number of consecutive occurrences reaches $N_{not\_on\_table}$). In some embodiments, $N_{not\_on\_table}$ can be different from $N_{on\_table}$. The output of the meta-classifying circuit 112 is updated according to the meta-classifier logic configuration and the configured meta-classifier output latency. In some embodiments $N_{on\_table}$ may be configured to be between 2 and 10, while $N_{not\_on\_table}$ may be configured to be between 2 and 10.

While use of the meta-classifying circuit 112 may increase the accuracy of the determination of whether or not the electronic device 101 is located on a stationary or stable surface, this increase in accuracy comes at a cost of increased system latency. However, even though latency increases as accuracy increases, the embodiment systems and methods achieve latencies that are less than 10 seconds (e.g., between 4 seconds and 9 seconds), even with the use of the meta-classifying circuit 112.

As discussed above, in low-power or low-cost implementations of the embodiment systems and methods, the second motion sensor 108 (e.g., gyroscope) and the data therefrom may not be used by the classifying circuit 106 to determine whether or not the electronic device 101 is located on a stationary or stable surface (e.g., on a table or in a drawer). In experiments that have been run, it has been noted that approximately 90% accuracy can be achieved if the classifying circuit 106 only uses the mean-cross values $MC_{i,102}$ and the variance of the norms $Var_{i,102}$ obtained from the first sensor data $102x$, $102y$, $102z$. In other words, labels Li are correctly given to approximately 90% of the acquisition time windows when only the mean-cross values $MC_{i,102}$ and the variance of the norms $Var_{i,102}$, obtained from the first sensor data $102x$, $102y$, $102z$, are used. As such, even in low-power and low-cost implementations of the embodiment systems and methods a high accuracy can be achieved, even without the use of a meta-classifying circuit 112. It has also been noted that when both the mean-cross values $MC_{i,102}$ and the variance of the norms $Var_{i,102}$ (obtained from the first sensor data $102x$, $102y$, $102z$) and the mean-cross values $MC_{i,108}$ and the variance of the norms $Var_{i,108}$ (obtained from the second sensor data $108x$, $108y$, $108z$) are used, approximately 97% accuracy can be achieved even without the use of a meta-classifying circuit 112.

In low-power applications, the choice of which data to extract from the acquisition time window Wii is based on a trade-off between accuracy and power consumption. Generally, the number of features determined by the first feature detection circuit 104 (and the second feature detection circuit 110 in embodiments that use it in conjunction with circuit 104) can be varied. For example, the mean for each axis can be computed, and this may be used to determine the mean-cross value for each axis for each acquisition time window $W_i$. As another example, the energy of the signal received from the motion sensors can be used. However, it is noted that determination of a greater number of features is accompanied by an increase in resources (e.g., memory, execution time, and power).

The output of the meta-classifying circuit 112 may be provided to a state monitor 114, which may adapt the behavior or operation of the electronic device 101. The state monitor 114 may be implemented using a controller and a memory register. The output of the classifying circuit 106 and/or the output of the meta-classifying circuit 112 may be stored in the memory register of the state monitor 114, and the controller of the state monitor 114 may be configured to read the content of the memory register. In response to a determination that the electronic device is on a stationary or stable surface (e.g., a table), the state monitor 114 may generate an interrupt signal 116 that may adapt the behavior or operation of electronic device 101, for example, fan speeds and clock frequencies of electronic components (e.g., of a central processing unit (CPU), a graphics processing unit (GPU), or a power supply unit) in the electronic device 101 may be increased to achieve better performance (e.g., faster computation times). Conversely, in response to a determination that the electronic device is not on a stationary or stable surface (e.g., when the electronic device is in motion or on a user's lap), the interrupt signal 116 may cause the clock frequencies of components in the electronic device 101 to be decreased to reduce power consumption and to avoid overheating of the components in the electronic device 101.

Figure 6C:
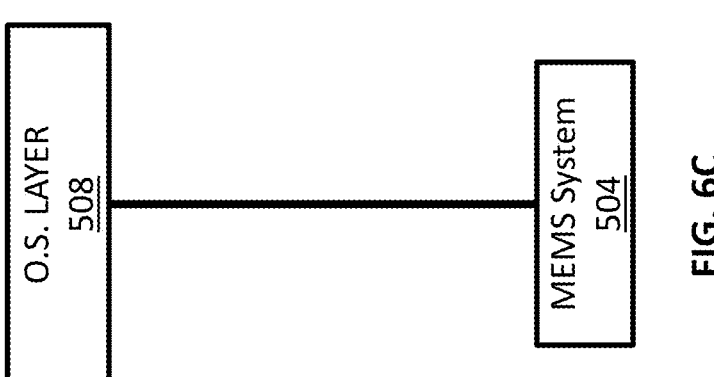
FIGS. 6A to 6C show block diagrams illustrating various ways of implementing the detection system of FIG. 1 and the method of FIG. 2, in accordance with various embodiments.

The embodiment systems and methods discussed above can be implemented in various ways. FIG. 6A shows a first example, where the method 200, as well as the classifying circuit and meta-classifying circuit 112, is implemented by a controller 502 (e.g., a microcontroller) that is coupled to a micro-electro-mechanical (MEMS) system-in-package 504. The MEMS system-in-package 504 may implement the first motion sensor 102 and/or the second motion sensor 108. Furthermore, the controller 502 may be included in a system-on-chip (SoC) 506, which is communicatively coupled to the operating system layer 508 of the electronic device 101.

Figure 6B:
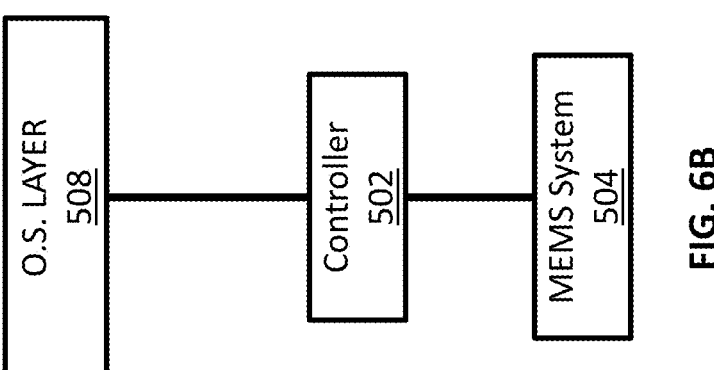
Figure 6A:
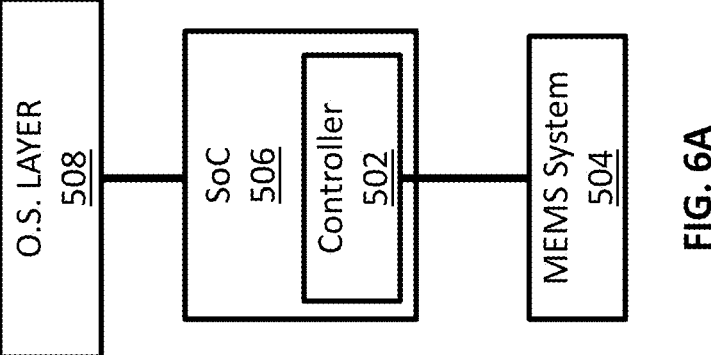

FIG. 6B shows another example, where the method 200, as well as the classifying circuit and meta-classifying circuit 112, is implemented by directly connecting the controller 502 to the operating system layer 508 (e.g., without the SoC 506 of FIG. 6A being an intervening connection).

FIG. 6C shows another example, where the method 200, as well as the classifying circuit and meta-classifying circuit 112, is implemented directly in hardware (e.g., directly on the MEMS system-in-package 504, aided by software embedded in the MEMS system-in-package 504) that is connected to the operating system layer 508. It is noted that current consumption of the implementation shown in FIG. 6A is greater than current consumption of the implementation shown in FIG. 6B, which is, in turn, greater than current consumption of the implementation shown in FIG. 6C.

The embodiment systems and methods have at least the following advantages: (1) are easily tuned or reconfigured (e.g., due to the use of machine learning approach for classifying circuit 106); (2) have low latency and short convergence times (e.g., less than 10 seconds, due to the time interval TI being split into a plurality of short time windows ti, each of which is about 1 second and also configurable/adjustable); (3) do not require calibration of the motion sensors (e.g., due to the use of orientation-independent features of mean-cross values and the variance of the norms, thereby exhibiting immunity against device-to-device variations, accelerometer offsets, and/or gyroscope bias); and (4) have greater reliability compared to conventional systems and methods since orientation-independent features are used in embodiment systems and methods. Furthermore, as mentioned in reference to FIG. 6C, the embodiment systems and methods may be executed directly in hardware, thus enabling ultra-low power implementations of the embodiment systems and methods.

In an embodiment, a system includes: a first motion sensor configured to generate first sensor data indicative of a first type of movement of an electronic device; a first feature detection circuit configured to determine at least one orientation-independent feature based on the first sensor data; and a classifying circuit configured to determine whether or not the electronic device is located on a stationary surface based on the at least one orientation-independent feature.

In an embodiment, a method includes: generating, by an accelerometer of an electronic device, first sensor data over an acquisition time window; generating, by a gyroscope of the electronic device, second sensor data over the acquisition time window; determining, by a first feature detection circuit, at least one first orientation-independent feature for the acquisition time window based on the first sensor data; determining, by a second feature detection circuit, at least one second orientation-independent feature for the acquisition time window based on the second sensor data; and executing, by a classification circuit, a machine learning classification to determine whether or not the electronic device is located on a stationary surface based on the at least one first orientation-independent feature and the at least one second orientation-independent feature.

In an embodiment, an electronic device includes a detection system. The detection system includes: an accelerometer configured to generate accelerometer data indicative of a first type of movement of an electronic device; a first feature detection circuit coupled to an output of the accelerometer and configured to determine at least one orientation-independent feature based on the accelerometer data; and a classifying circuit configured to determine whether or not the electronic device is located on a stationary surface based on the at least one orientation-independent feature.

FIGS. 7A through 11 relate to embodiment systems and methods that operate in laptops, tablets, and related convertible electronic devices (e.g., laptops with tablet modes, tablets with laptop modes, or the like) that can be used in different modalities or device modes and include touchscreens. Motion sensors used for determining whether or not the electronic device is located on a stationary or stable surface may be mounted behind respective touchscreens of the electronic devices. Touchscreen operation by the user can cause interference with the motion sensors, leading to less accurate determination of whether or not the electronic device is located on a stationary or stable surface. Different algorithms of determining whether or not the electronic device is located on a stationary or stable surface (also referred to as On-Table Detection (OTD) algorithms) may be used for each combination of whether or not the touchscreen is detected to be in use with each device mode. Data from an electrostatic sensor can be used to determine touchscreen use state without querying the touchscreen controller, which is useful for improving accuracy of the determination if the electronic device is located on a stationary or stable surface.

FIGS. 7A to 7G illustrate different device modes for an example electronic device 600 (e.g., a convertible laptop computer) with a screen panel 602 and a keyboard panel 604. The different device modes may include different orientations of the screen panel 602 and keyboard panel 604 of the electronic device with respect to each other and with respect to the vertical direction (i.e., the direction of gravitational acceleration towards the center of the earth), such as lid closed mode, clamshell mode, flat mode, tent mode, stand mode, tablet mode, and book mode. As the motion sensor of the electronic device 600 may be coupled differently with respect to the stable surface and the user interaction in each device mode, it may be useful to have independent algorithms for determining whether or not the electronic device is located on a stationary or stable surface for each device mode.

Figure 7B:
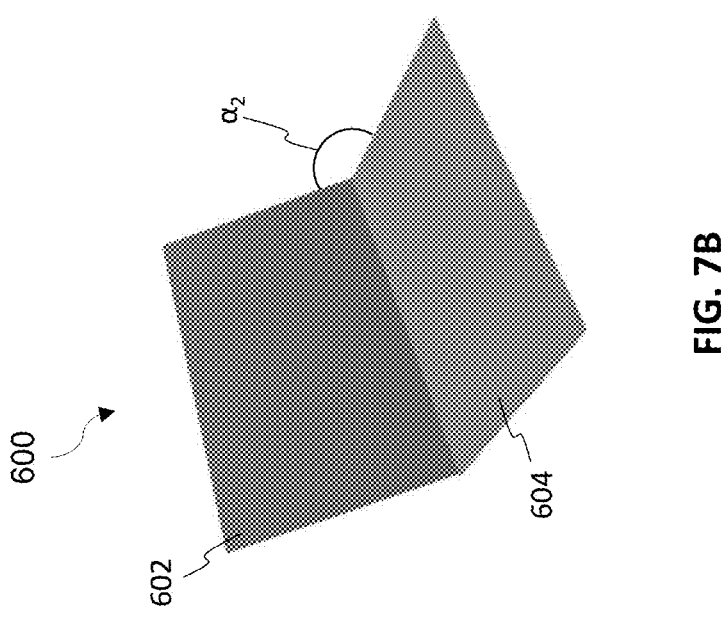
FIGS. 7A to 7G show device modes for electronic devices, in accordance with various embodiments.
Figure 7A:
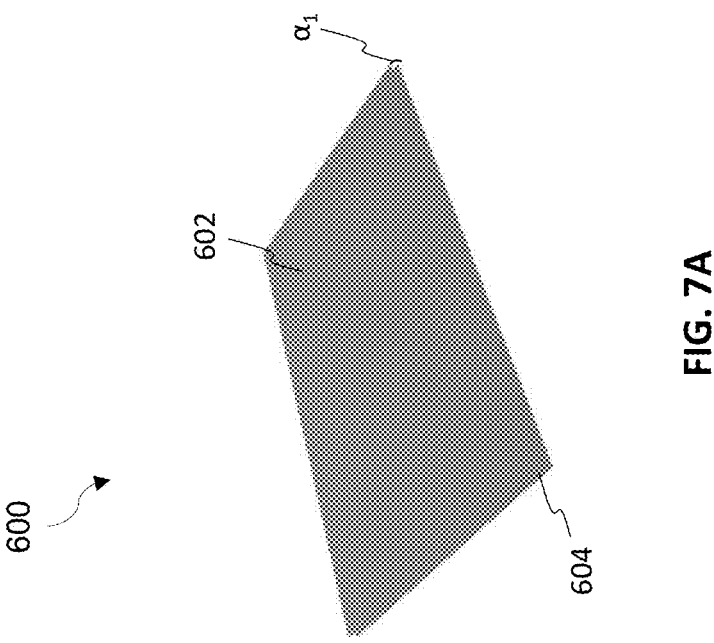

FIG. 7A shows the electronic device 600 in a closed lid mode. The back side of the screen panel 602 (also referred to as the lid) is shown facing up and the front side of the keyboard panel 604 is beneath the front side of the screen panel 602. The front side of the screen panel 602 includes the display screen, which may be a touchscreen. The front side of the keyboard panel 604 may include a typing surface with keys or the like. The back side of the keyboard panel 604 is resting on a surface (not illustrated), such as a tabletop, the lap of a user, or the like. In some embodiments, a lid angle $\alpha_1$ between the front side of the screen panel 602 and the front side of the keyboard panel 604 is in a range of 0° to 34° in the closed lid mode. In some other embodiments, the closed lid mode is detected through the usage of a magnetic Hall sensor and a magnet.

FIG. 7B shows the electronic device 600 in a clamshell mode. This clamshell mode may be a commonly used orientation for a laptop computer with the keyboard panel 604 resting with its back side on a surface (not illustrated) and the front side of the screen panel 602 facing forwards and up, such as towards a user. In some embodiments, a lid angle $\alpha_2$ between the respective front sides of the screen panel 602 and the keyboard panel 604 is in a range of 35° to 159° in the closed lid mode.

Figures 7C, 7D:
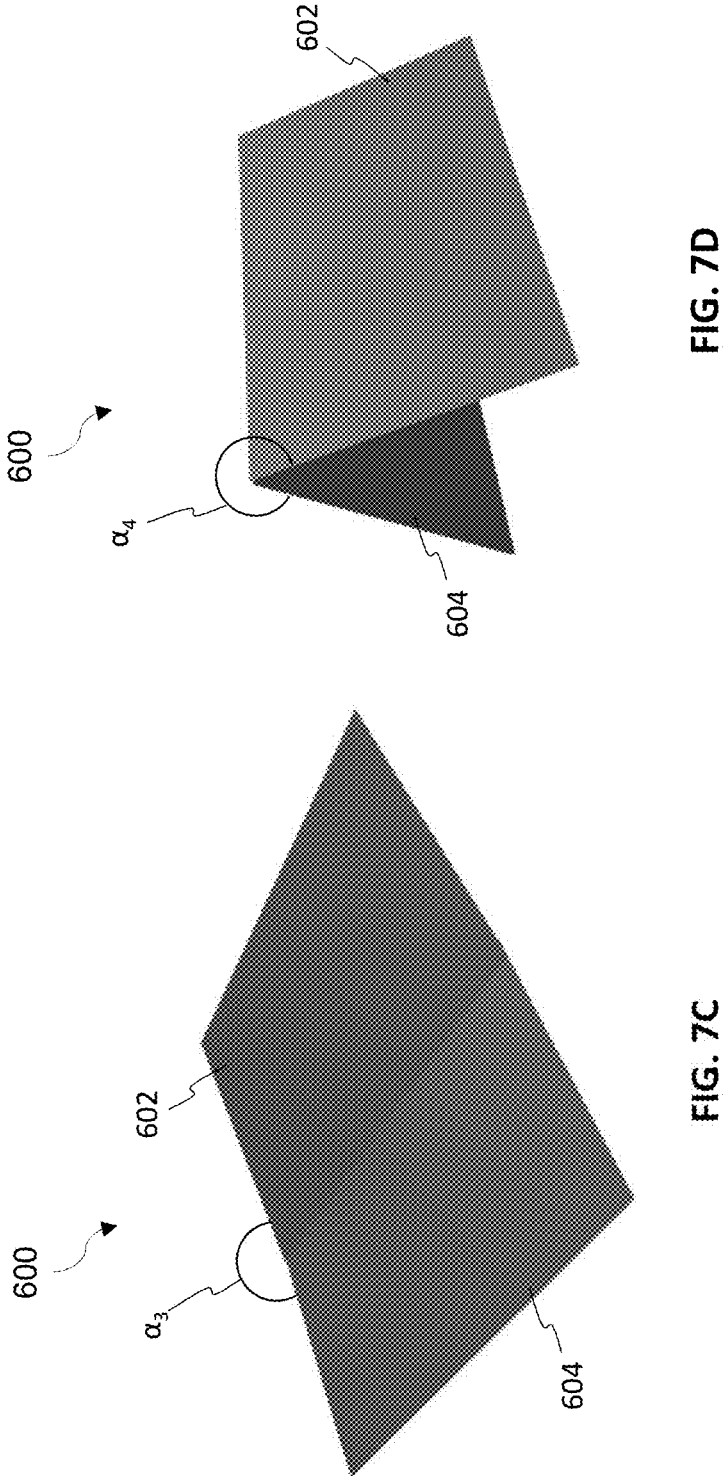

FIG. 7C shows the electronic device 600 in a flat mode. The respective back sides of the screen panel 602 and the keyboard panel 604 rest on a surface (not illustrated), and the respective front sides of the screen panel 602 and the keyboard panel 604 face upwards, such as towards a user. In some embodiments, a lid angle $\alpha_3$ between the respective front sides of the screen panel 602 and the keyboard panel 604 is in a range of 160° to 200° in the flat mode.

FIG. 7D shows the electronic device 600 in a tent mode. The orientation of the display screen of the screen panel 602 is flipped by 180° and the longitudinal edges of the screen panel 602 and the keyboard panel 604 that are opposite to the hinge rest on a surface (not illustrated) so that the electronic device 600 resembles a tent shape. In the tent mode, user input may be made on a touchscreen interface on the front side of the screen panel 602. In some embodiments, a lid angle $\alpha_4$ between the respective front sides of the screen panel 602 and the keyboard panel 604 is in a range of 201° to 340° in the tent mode.

Figures 7E, 7F:
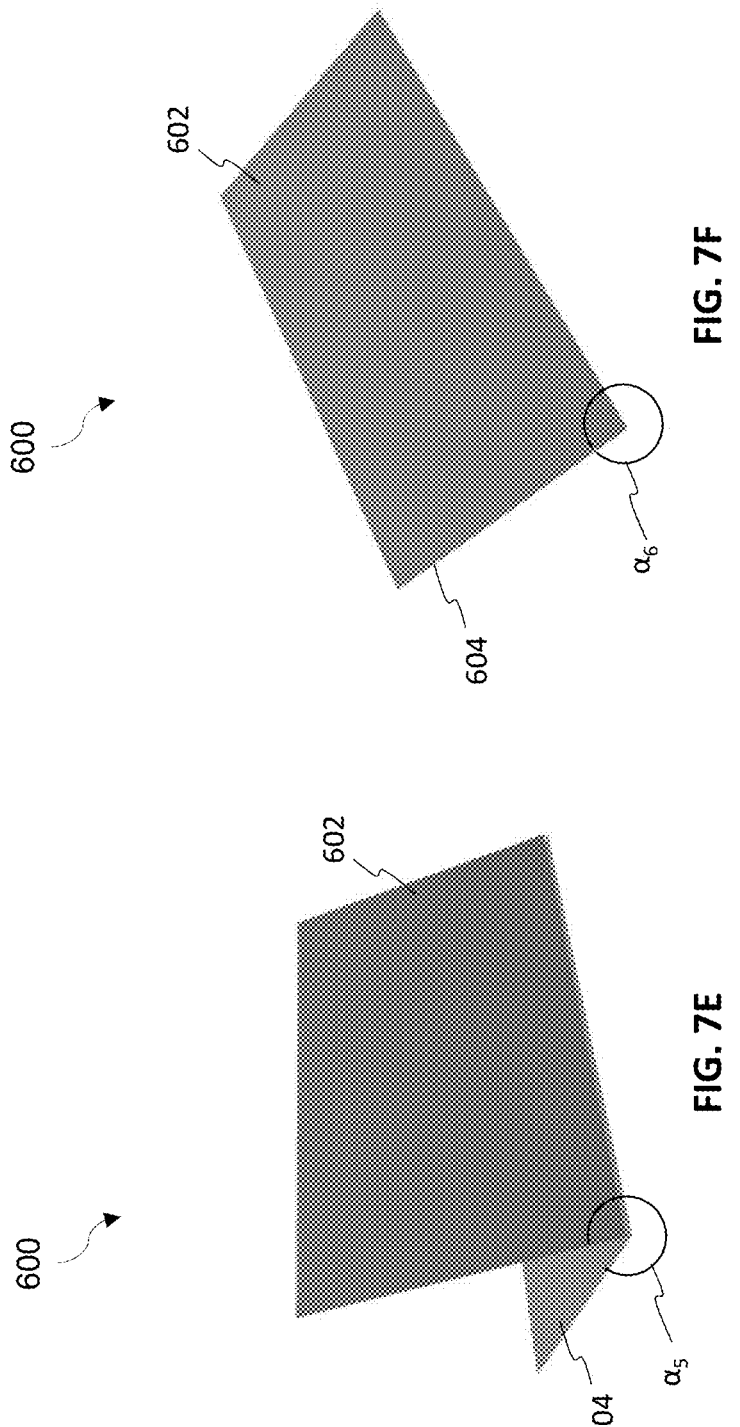

FIG. 7E shows the electronic device 600 in a stand mode. The orientation of the display screen of the screen panel 602 may be the same as in the clamshell mode (see above, FIG. 7B) and the front side of the keyboard panel 604 rests on a surface (not illustrated) so that the typing surface faces down. In the stand mode, user input may be made on a touchscreen interface on the front side of the screen panel 602. In some embodiments, a lid angle as between the respective front sides of the screen panel 602 and the keyboard panel 604 is in a range of 201° to 340° in the stand mode.

FIG. 7F shows the electronic device 600 in a tablet mode. The orientation of the display screen of the screen panel 602 may be the same as in the clamshell mode (see above, FIG. 7B) and the stand mode (see above, FIG. 7E) and the front side of the keyboard panel 604 rests on a surface (not illustrated) so that the typing surface faces down. In the tablet mode, user input may be made on a touchscreen interface on the front side of the screen panel 602. In some embodiments, a lid angle as between the respective front sides of the screen panel 602 and the keyboard panel 604 is in a range of 341° to 360° in the tablet mode. In some other embodiments, the tablet mode is detected through the usage of a magnetic Hall sensor and a magnet.

Figure 7G:
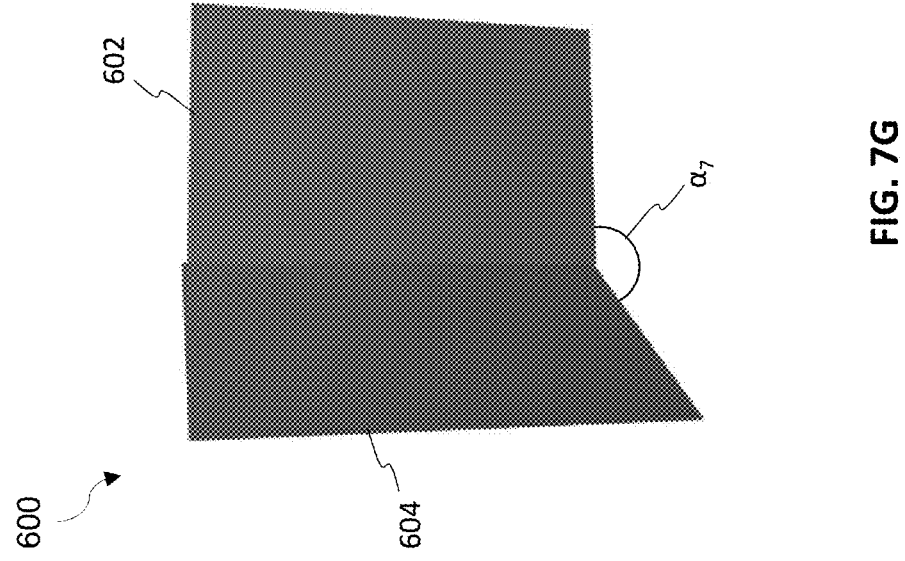

FIG. 7G shows the electronic device 600 in a book mode. The hinge between the screen panel 602 and the keyboard panel 604 is almost parallel to the vertical direction (i.e., the direction of gravitational acceleration towards the center of the earth) so that the respective front sides of the screen panel 602 and the keyboard panel 604 may face a user in a manner like an open book. The orientation of the display screen of the screen panel 602 may be rotated by 90° from the orientation of the clamshell mode (see above, FIG. 7B) so that the display is upright to the user. In some embodiments, a lid angle $\alpha_7$ between the respective front sides of the screen panel 602 and the keyboard panel 604 is in a range of 35° to 200° in the book mode.

The orientation of the one or more motion sensor(s) affects the device mode of the electronic device 600. In various embodiments, the electronic device 600 includes a screen motion sensor located in the screen panel 602 and a keyboard motion sensor located in the keyboard panel 604. The screen motion sensor and the keyboard motion sensor may each include one or more respective accelerometer(s) and one or more respective gyroscope(s), also referred to as screen accelerometer(s) $XL_S$, screen gyroscope(s) $G_S$, keyboard accelerometer(s) $XL_K$, and keyboard gyroscope(s) $G_K$. Data from the screen accelerometer(s) $XL_S$, screen gyroscope(s) $G_S$, keyboard accelerometer(s) $XL_K$, and keyboard gyroscope(s) $G_K$ may be used by a processor to determine the current device mode of the electronic device 600 (e.g., closed lid mode, clamshell mode, tent mode, stand mode, or the like). As the various motion sensors of the electronic device 600 may be coupled differently with respect to the stable surface and the user interaction in each device mode, it is advantageous to use a different OTD algorithm for each device mode.

Additionally, in embodiments where one or more motion sensor(s) is located in the screen panel 602 and the screen panel comprises a touchscreen, the accuracy of the OTD algorithm may be affected by a user interacting with the touchscreen. For example, in the clamshell mode (see above, FIG. 7B), when the user touches a touchscreen on the screen panel 602 with a fingertip, the screen motion sensor(s) may vibrate due to oscillation of the screen panel on the hinge between the screen panel 602 and the keyboard panel 604. These vibrations may be difficult to filter out even when the electronic device 600 is located on a stable or stationary surface (in other words, on-table). The vibrations may affect the accuracy of the OTD algorithm, e.g., by interfering with the mean-cross values and variances of the norm of the screen motion sensor(s). As such, the user touching the touchscreen of the electronic device 600 while the electronic device 600 is on-table may lead to the OTD algorithm producing an incorrect result of the electronic device 600 being off-table. This can lead to worse performance of the electronic device 600 if it is switched into an off-table lower power mode while the electronic device 600 is on-table. Rapid oscillation between on-table and off-table power modes could also result from touchscreen usage, which may affect system performance, power efficiency, and/or user experience. For example, touchscreen usage may decrease accuracy of an OTD algorithm tuned for use in a clamshell mode from about 95% to about 80%. In order to address these issues, different OTD algorithms may be used when the touchscreen of the electronic device 600 is in operation (e.g., being touched by the user) and when the touchscreen of the electronic device 600 is not in operation.

FIG. 8 shows a table of different OTD algorithms that may be used for an electronic device 600 in different device modes and when the touchscreen is or is not in use. A processing unit of the electronic device 600 (e.g., a CPU, sensor hub, or the like) may change the OTD algorithm used during runtime based on measurements determining the current device mode and whether or not the touchscreen is in use. Each row of the table corresponds to a different device mode of the electronic device 600 (e.g., j=0 for clamshell mode, j=1 for tent mode, j=2 for stand mode, and the like) up to some device mode for which j=N. The columns of the table correspond to whether the touchscreen is in use (e.g., is actively being touched by a user) or not. As such, the table includes a different OTD algorithm for each combination of device mode and whether or not the touchscreen is in use. For example, OTD algorithm o may be run when the electronic device 600 is in clamshell mode and the touchscreen is in use, OTD algorithm 1 may be run when the electronic device 600 is in clamshell mode and the touchscreen is not in use, OTD algorithm 2 may be run when the electronic device 600 is in tent mode and the touchscreen is in use, OTD algorithm 3 may be run when the electronic device 600 is in tent mode and the touchscreen is not in use, OTD algorithm 4 may be run when the electronic device 600 is in stand mode and the touchscreen is in use, OTD algorithm 5 may be run when the electronic device 600 is in stand mode and the touchscreen is not in use, OTD algorithm 2N may be run when the electronic device 600 is in some other mode and the touchscreen is in use, and OTD algorithm 2N+1 may be run when the electronic device 600 is in some other mode and the touchscreen is not in use. Any suitable number of device modes may be covered by respective OTD algorithms tuned for handling the cases of the touchscreen being in use and the touchscreen not being in use. In some embodiments, OTD algorithms are implemented as decision trees and may be run as embedded logic in the motion sensors of the electronic device 600.

In various embodiments, the processing unit (e.g., a sensor hub that may be a microcontroller unit or the like) of the electronic device 600 that determines which OTD algorithm to run may not receive signals from the touchscreen. Receiving touchscreen usage information from a controller of the touchscreen may need active querying of the touchscreen controller by the processing unit. This may be disadvantageous due to possibly requiring additional printed circuit board routings or redundant touchscreen driver implementation in the processing unit. Additionally, touchscreen driver implementation could lead to continuous driver updates to support newer touchscreens and disadvantageous use of processing unit firmware memory space by the touchscreen driver. In order to avoid these disadvantages, the processing unit may determine touchscreen activity by using data from an electrostatic sensor in the screen panel 602. In some embodiments, the electrostatic sensor is part of the screen motion sensor together with a screen accelerometer $XL_S$ and/or screen gyroscope $G_S$. As such, the processing unit may receive data from the electrostatic sensor through its coupling to the screen motion sensor, and touchscreen activity can be determined without querying the touchscreen controller. In other embodiments, the electrostatic sensor is mounted in the screen panel 602 but is separate from the screen motion sensor.

Figure 9A:
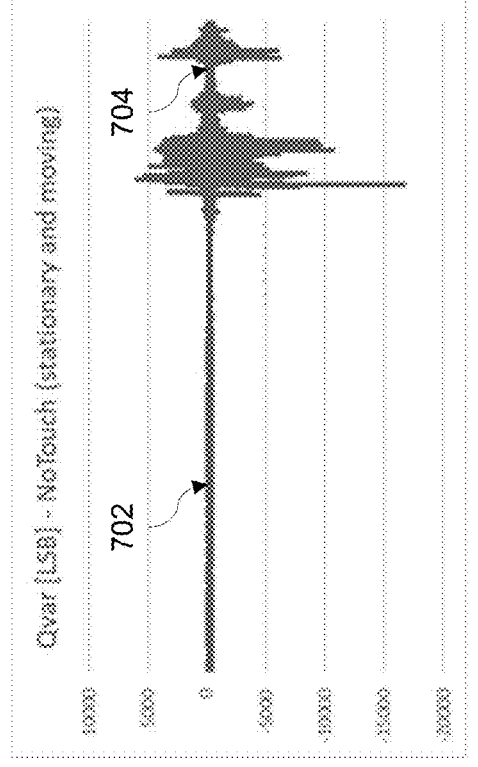
FIGS. 9A to 9C show signals measured by an electrostatic sensor, in accordance with various embodiments.
Figure 9B:
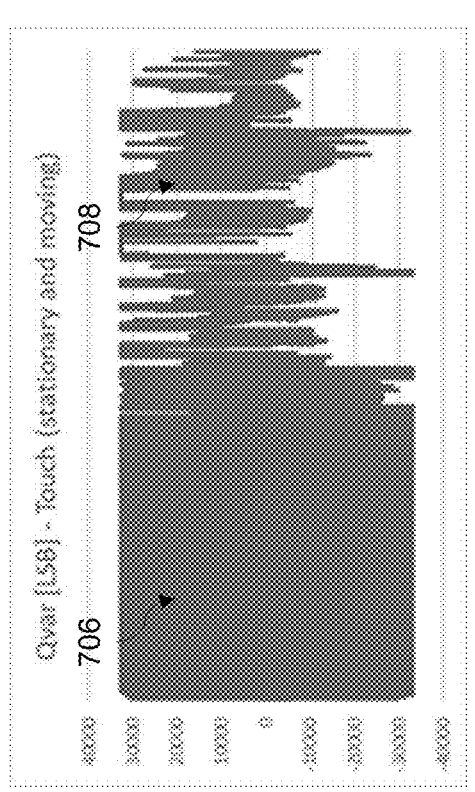
Figure 9C:
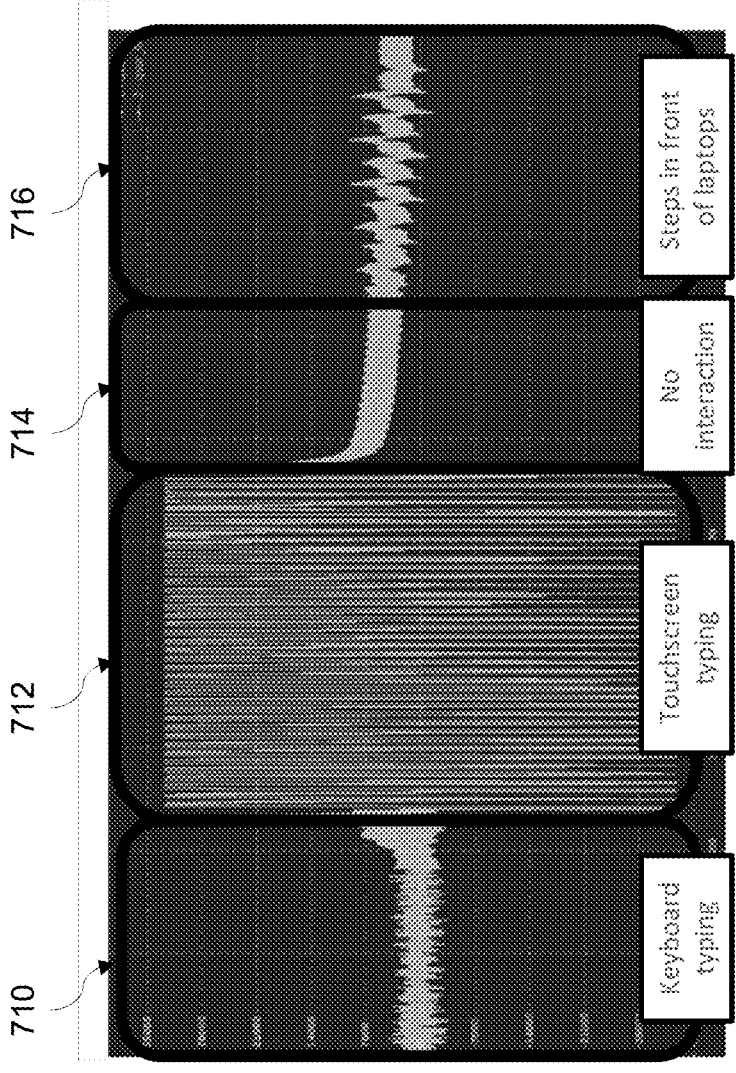

FIGS. 9A-9C show signals measured by an electrostatic sensor (also referred to as Qvar) that may be used to determine if the touchscreen is currently being used. The touchscreen of the screen panel 602 (see above, FIGS. 7A-7G) may be used as an input to the electrostatic sensor. For example, one pin electrically coupled with the touchscreen may be connected to the electrostatic sensor. The touchscreen may then act as an electrode for the electrostatic sensor. The signal from the electrostatic sensor is amplified when the electrode (in other words, the touchscreen) is touched by a user using a finger, stylus, or the like.

FIG. 9A illustrates example signals from the electrostatic sensor when the touchscreen of the electronic device 600 is not in active use. Signal 702 is measured by the electrostatic sensor when the touchscreen is not being touched and the electronic device 600 is stationary (e.g., on-table). Signal 704 is measured by the electrostatic sensor when the touchscreen is not being touched and the electronic device 600 is moving (e.g., off-table).

FIG. 9B illustrates example signals from the electrostatic sensor when the touchscreen of the electronic device 600 is in active use. Signal 706 is measured by the electrostatic sensor when the touchscreen is receiving a stationary touch (e.g., a stationary finger on the touchscreen. Signal 708 is measured by the electrostatic sensor when the touchscreen is receiving a moving touch (e.g., a moving finger on the touchscreen during drawing). As shown in FIGS. 9A and 9B, through the processing of the electrostatic sensor data, it is possible to distinguish the touchscreen being touched from the touchscreen not being touched. For example, the mean value of the electrostatic sensor signal while the touchscreen is not being touched may be about o and the amplitude of the electrostatic sensor signal may be within a range of −15000 LSB (least significant bits) to +10000 LSB (see FIG. 9A) even while the electronic device is not on-table, but the mean value of the electrostatic sensor signal may be greater than 10000 LSB and the amplitude of the electrostatic sensor signal may be outside the range of 15000 LSB to +10000 LSB when the touchscreen is being touched.

FIG. 9C illustrates additional example signals from the electrostatic sensor in various modes of touchscreen usage for the electronic device 600, as shown in respective windows 710, 712, 714, and 716. Window 710 shows a signal from the electrostatic sensor while keyboard typing is being performed (e.g., on the keyboard panel 604) and the touchscreen is not in use. Window 712 shows a signal from the electrostatic sensor while touchscreen typing is being performed. Window 714 shows a signal from the electrostatic sensor after touchscreen typing was just performed in window 712 and no user interaction is being made with the electronic device 600. Window 714 shows a signal from the electrostatic sensor while no user interaction is being made with the electronic device 600 but footsteps are occurring in front of or nearby the electronic device 600. As shown by FIG. 9C, signal from touchscreen usage can be clearly distinguished from other signals occurring when the touchscreen is not in use, since the amplitude of the signal in window 712 (when the touchscreen is in use) is significantly greater than the amplitudes of the signals in windows 710, 714 and 716 (when the touchscreen is not in use). In various embodiments, a raw signal from the electrostatic sensor, a filtered signal from the electrostatic sensor, or a combination thereof may be used to detect touchscreen operation.

In some embodiments, the electrostatic sensor and touchscreen may be used for other applications such as presence sensing (in other words, detecting the presence of a nearby human). For example, window 716 shows that vibrations from nearby footsteps can be detected by the electrostatic sensor. One or more additional algorithm(s) may be implemented to perform presence sensing using signal from the electrostatic sensor with the touchscreen acting as an electrode.

Figure 10:
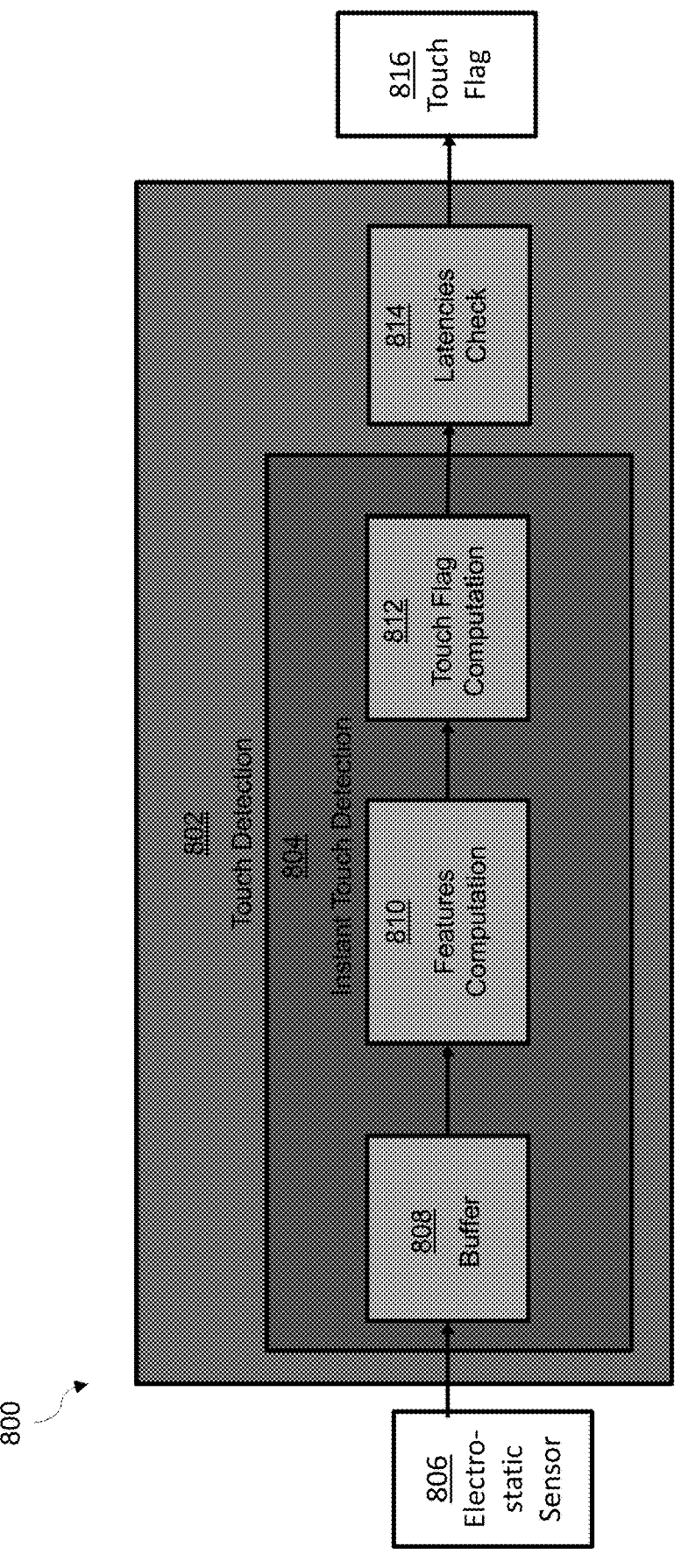
FIG. 10 is a block diagram of a touch detection algorithm for a touchscreen, in accordance with various embodiments.

FIG. 10 is a block diagram of a touch detection algorithm 800 that uses a signal from an electrostatic sensor to determine if the touchscreen is in use. In some embodiments, the touch detection algorithm 800 is implemented in a processing unit (e.g., a sensor hub that may be a microcontroller unit or the like) of the electronic device 600. However, the touch detection algorithm may be implemented as instructions in any suitable combination of hardware, firmware, and/or software. In some embodiments, the touch detection algorithm may be implemented in the MEMS system-in-package 504 (see above, FIGS. 6A-6C), aided by software embedded in the MEMS system-in-package.

The touch detection algorithm 800 includes a touch detection block 802 that accepts input signal from the electrostatic sensor 806 and provides a touch flag 816 indicating if the touchscreen is in active use or not. The touch detection block 802 includes an instant touch detection block 804 that is run to determine if the touchscreen is currently active and a latencies check block 814 to reduce continued switching of OTD algorithms.

The electrostatic sensor 806 provides a signal to a buffer 808 of the instant touch detection block 804. In some embodiments, data from the electrostatic sensor 806 is collected at a rate in a range of 120 Hz to 960 Hz, such as 240 Hz, and subsampled at a rate in a range of 30 Hz to 120 Hz, such as 120 Hz. In various embodiments, the buffer 808 has a size in a range of 15 samples to 960 samples, such as 30 samples. The size of the buffer 808 may determine the size of the latency for computing a touch flag from the data of the electrostatic sensor 806. A smaller buffer size may allow for a more reactive response to a user starting and stopping usage of the touchscreen. For example, a buffer 808 with a size of 30 samples that are subsampled from the electrostatic sensor 806 at a rate of 120 Hz may provide a minimum latency of about 250 milliseconds.

When the buffer 808 is full, the data is provided to the features computation block 810, which computes features values from the buffered data for comparison with thresholds. In various embodiments, the features values computed by the features computation block 810 include the variance of the buffered data, the energy of the buffered data, the peak-to-peak distances of the buffered data, the maxima and/or minima of the buffered data, the like, or a combination thereof. The touch flag computation block 812 then compares the features values to respective threshold values in order to output an instant touch flag. For example, the variance of the buffered data may be compared with a threshold value of 5 LSB. The instant touch flag indicates that the touchscreen is currently in operation (e.g., being touched by a user) with a value of "touch" or that the touchscreen is not currently in operation with a value of "no-touch". Next, the instant touch detection block 804 provides the instant touch flag to the latencies check block 814.

The latencies check block 814 processes the instant touch flag received from the instant touch detection block 804 according to set latency values in order to reduce continuous OTD algorithm switching and/or false positives of touch detection. The latencies check block 814 may be configured to output a touch flag 816 with a value of "no-touch" as a default at the start of running, to output a touch flag 816 with a value of "touch" when the instant touch flag has a value of "touch" for a first duration, and to output a touch flag 816 with a value of "no-touch" when the instant touch flag has a value of "no-touch" for a second duration. In some embodiments, the first duration is configured to a very short length (e.g., the length of buffer 808) and the second duration is configured to a long length (e.g., a length of 10 seconds). Setting the first duration to be very short can reduce the touch latency to be very reactive when the user begins using the touchscreen. Setting the second duration to be long can reduce continuous OTD algorithm switching, as the OTD algorithm will switch to an inactive touchscreen algorithm only after the second duration (e.g., 10 seconds) passes without the user using the touchscreen. However, any suitable latency values (in other words, the first and second durations) may be used. The touch detection latencies check block 814 then provides the touch flag 816 to, e.g., an OTD selector block (see below, FIG. 11).

Figure 11:
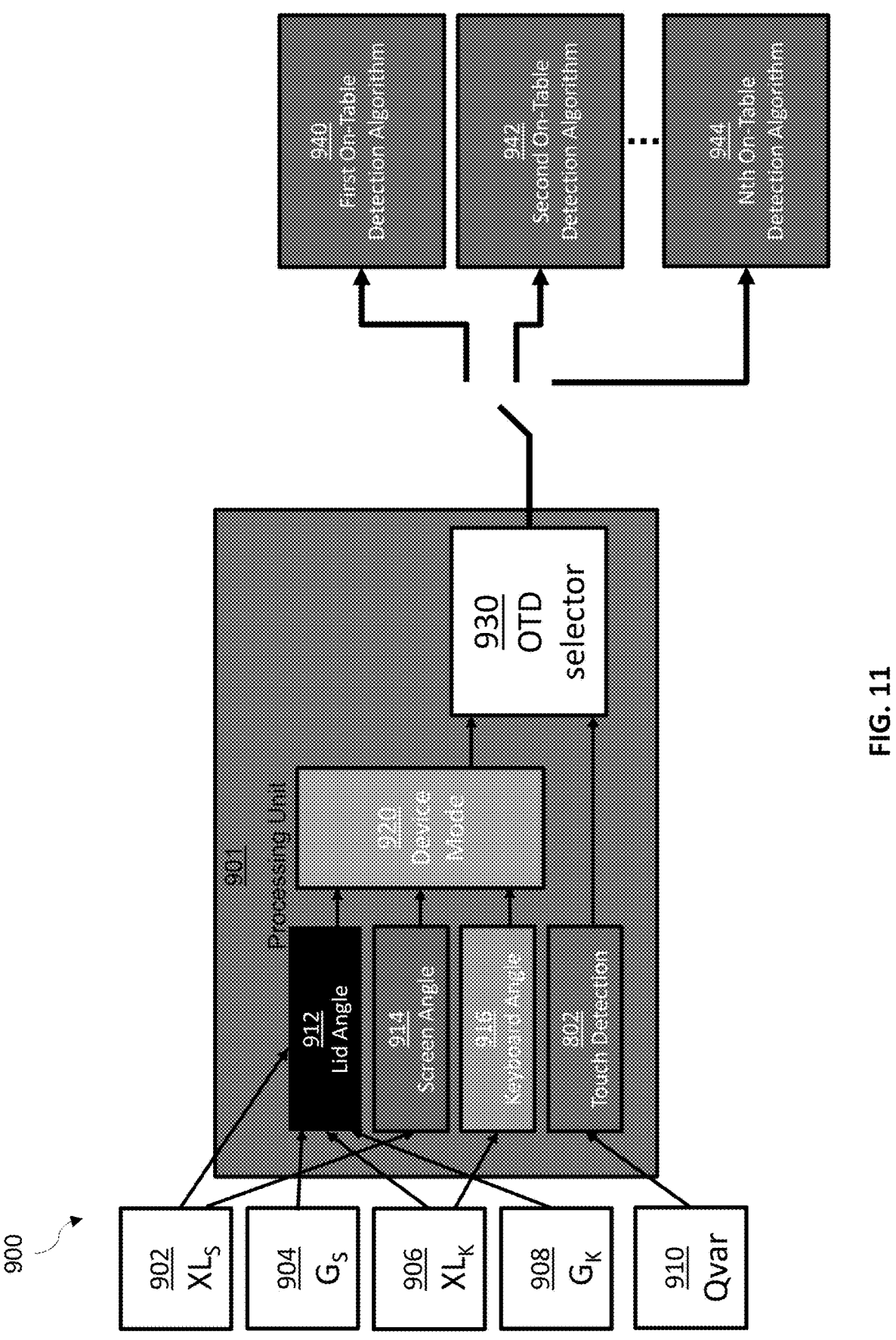
FIG. 11 is a block diagram of an on-table detection selector algorithm, in accordance with various embodiments.

FIG. 11 is a block diagram of an OTD selector algorithm 900, in accordance with some embodiments. A processing unit 901 (e.g., a sensor hub that may be a microcontroller unit or the like) of the electronic device 600 receives input from a screen accelerometer $XL_S$ 902, a keyboard accelerometer $XL_K$ 906, and an electrostatic sensor Qvar 910. In some embodiments, the processing unit 901 further receives input from a screen gyroscope $G_S$ 904 and a keyboard gyroscope $G_K$ 908. A lid angle block 912 run by the processing unit 901 uses input from the screen accelerometer $XL_S$ 902 and the keyboard accelerometer $XL_K$ 906 to determine the lid angle α (see above, FIGS. 7A-7G) between the screen panel 602 and the keyboard panel 604 of the electronic device 600. In some embodiments, the lid angle block 912 further uses the screen gyroscope $G_S$ 904 and the keyboard gyroscope $G_K$ 908 to determine the lid angle α. The processing unit 901 may further be programmed with: a screen angle block 914 that uses input from the screen accelerometer $XL_S$ 902 to determine a screen angle between the screen panel 602 and the vertical direction (i.e., the direction of gravitational acceleration towards the center of the earth); and a keyboard angle block 916 that uses input from the keyboard accelerometer $XL_K$ 906 to determine a keyboard angle between the keyboard panel 604 and the vertical direction. A device mode block 920 run by the processing unit 901 uses the lid angle α determined by the lid angle block 912, the screen angle determined by the screen angle block 914, and/or the keyboard angle determined by the keyboard angle block 916 to determine the current device mode of the electronic device 600 in real time (e.g., whether the electronic device is in closed lid mode, clamshell mode, stand mode, or the like; see above, FIGS. 7A-7G). A touch detection block 801 uses input from the electrostatic sensor Qvar 910 to provide a touch flag 816 (see above, FIG. 10) indicating whether or not a touchscreen of the screen panel 602 is being used by a user (also referred to as the current activity of the touchscreen).

The processing unit 901 is further programmed with an OTD selector block 930, which receives input from the device mode block 920 and the touch detection block 802. The OTD selector block 930 uses the current device mode determined by the device mode block 920 and the touch flag 816 determined by the touch detection block 802 to select an appropriate on-table detection (OTD) algorithm to run, e.g., a first OTD algorithm 940, a second OTD algorithm 942, or the like, up to an Nth OTD algorithm 944. The selected OTD algorithm may be updated in real time by the processing unit 901 as the device mode of the electronic device 600 and/or the active use of the touchscreen changes. This allows for reaching higher accuracy for all supported device modes of the electronic device 600, and for reaching higher accuracy when the touchscreen is being used.

In some embodiments, the processing unit 901 running the OTD selector block 930 selects an OTD algorithm based on the determination of the device mode by the device mode block 920 without using input from the electrostatic sensor Qvar 910 (in other words, the processing unit 901 selects an OTD algorithm for the current device mode regardless of touchscreen use). This may be useful for electronic devices 600 that do not include touchscreens or electrostatic sensors. In some embodiments, the processing unit 901 running the OTD selector block 930 selects an OTD algorithm based on the determination of touchscreen usage by the touch detection block 802 without using input from the device mode block 920 (in other words, the processing unit 901 selects an OTD algorithm for the current status of touchscreen usage regardless of device mode). This may be useful for electronic devices 600 that use only one device mode (e.g., a tablet mode or clamshell mode) in conjunction with a touchscreen.

In some embodiments, the selected OTD algorithm is executed as a decision tree in a motion sensor of the electronic device 600. The selected OTD algorithm may have improved accuracy for the current device mode of the electronic device 600 and/or for the status of current touchscreen activity (e.g., recent usage of the touchscreen by the user). Implementing the OTD algorithms in hardware (e.g., in the motion sensors) may be advantageous by reducing current consumption. For example, in some embodiments less than 1 mA of current is used by the motion sensor(s) when running the OTD algorithms. In other embodiments, the OTD algorithms may be run in an application processor or in a microcontroller or co-processor of the electronic device 600.

Figure 12:
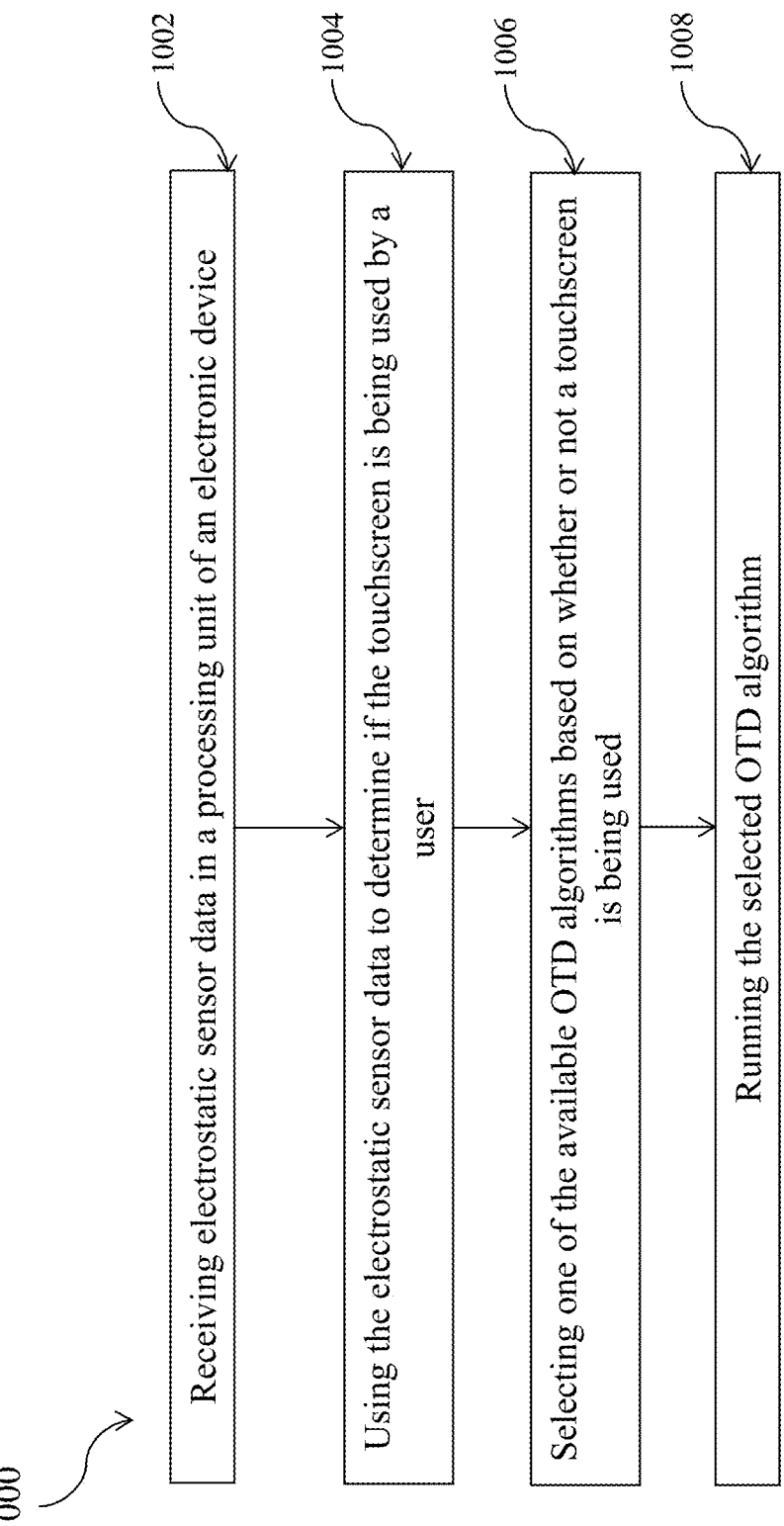
FIG. 12 is a flowchart of a method for selecting an on-table detection algorithm, in accordance with some embodiments.

FIG. 12 is a flowchart of a method 1000 for selecting an on-table detection (OTD) algorithm, in accordance with some embodiments. Step 1002 includes receiving electrostatic sensor data in a processing unit of an electronic device 600, as described above with respect to FIG. 10. The electrostatic sensor data is received from an electrostatic sensor 806 mounted behind a touchscreen of the electronic device 600. The touchscreen is part of a screen panel 602 of the electronic device 600. Step 1004 includes using the electrostatic sensor data to determine if the touchscreen is being used by a user, as described above with respect to FIG. 10. Step 1006 includes selecting one of the available OTD algorithms from a plurality of OTD algorithms based on whether or not the touchscreen is being used, as described above with respect to FIG. 11. Step 1008 includes running the selected OTD algorithm, as described above with respect to FIG. 11. The selected OTD algorithm determines whether or not the electronic device 600 is located on a stationary surface. In some embodiments, the selected OTD algorithm is implemented as a decision tree in the electronic device 600.

FIG. 13 is a flowchart of another method 2000 for selecting an on-table detection (OTD) algorithm, in accordance with some embodiments. Step 2002 includes receiving motion sensor data in a processing unit of an electronic device 600, as described above with respect to FIG. 10. The motion sensor data is received from a first motion sensor and a second motion sensor. The first motion sensor is mounted in a screen panel 602 of the electronic device 600, and the second motion sensor is mounted in a keyboard panel 604 of the electronic device 600. Step 2004 includes using the motion sensor data to determine a current lid angle α between the screen panel 602 and the keyboard panel 604 of the electronic device 600, a current screen angle between the screen panel and the vertical direction, and a current keyboard angle between the keyboard panel and the vertical direction, as described above with respect to FIG. 11. Step 2006 includes determining a current device mode of the electronic device 600 based on the current lid angle α, as described above with respect to FIG. 11. Step 2008 includes selecting one of the available OTD algorithms from a plurality of OTD algorithms based on the current device mode, as described above with respect to FIG. 11. Step 2008 includes running the selected OTD algorithm, as described above with respect to FIG. 11. The selected OTD algorithm determines whether or not the electronic device 600 is located on a stationary surface. In some embodiments, the selected OTD algorithm is implemented as a decision tree in the first motion sensor.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The devices and processing systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a processor, a digital signal processor (DSP), an Application Specific Integrated Circuit (ASIC), a field programmable gate array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), firmware, non-transitory memory, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. As such, the instructions being any suitable combination of hardware, firmware, software, or the like is within the scope of the disclosed embodiments.

Example embodiments of the disclosure are summarized here. Other embodiments can also be understood from the entirety of the specification as well as the claims filed herein.

Example 1. A method including: receiving electrostatic sensor data in a processor of an electronic device, the electrostatic sensor data being received from an electrostatic sensor mounted behind a touchscreen of the electronic device, the touchscreen being part of a screen panel of the electronic device; using the electrostatic sensor data to determine when the touchscreen is being used; based on whether or not the touchscreen is being used, selecting an on-table detection algorithm from a plurality of available on-table detection algorithms; and running the selected on-table detection algorithm, where the selected on-table detection algorithm determines whether or not the electronic device is located on a stationary or stable surface.

Example 2. The method of example 1, where the electrostatic sensor is configured to use the touchscreen as an electrode.

Example 3. The method of one of examples 1 or 2, where determining if the touchscreen is being used further includes filling a buffer with the electrostatic sensor data.

Example 4. The method of example 3, where determining if the touchscreen is being used further includes: computing a variance of the electrostatic sensor data stored in the buffer; and comparing the variance with a threshold value.

Example 5. The method of example 4, where determining if the touchscreen is being used further includes setting a touch flag based on the comparison of the variance with the threshold value.

Example 6. The method of one of examples 1 to 5, where the selected on-table detection algorithm is executed in a first motion sensor, the first motion sensor being mounted behind the touchscreen.

Example 7. A method including: receiving motion sensor data in a processor of an electronic device, the motion sensor data being received from a first motion sensor and a second motion sensor, the first motion sensor being mounted in a screen panel of the electronic device, and the second motion sensor being mounted in a keyboard panel of the electronic device; using the motion sensor data to determine a current lid angle between the screen panel and the keyboard panel of the electronic device, a current screen angle between the screen panel and the vertical direction, and a current keyboard angle between the keyboard panel and the vertical direction; based on the current lid angle, the current screen angle, and the current keyboard angle, determining a current device mode of the electronic device; based on the current device mode, selecting an on-table detection algorithm from a plurality of available on-table detection algorithms; and running the selected on-table detection algorithm, where the selected on-table detection algorithm determines whether or not the electronic device is located on a stationary surface, and where the selected on-table detection algorithm is executed as program instructions in the first motion sensor.

Example 8. The method of example 7, where the current device mode is a clamshell mode.

Example 9. The method of example 7, where the current device mode is a flat mode.

Example 10. The method of example 7, where the current device mode is a stand mode.

Example 11. The method of example 7, where the current device mode is a tent mode.

Example 12. The method of example 7, where the current device mode is a tablet mode.

Example 13. The method of example 7, where the current device mode is a book mode.

Example 14. A system including: a first motion sensor configured to generate first motion sensor data indicative of a first type of movement of an electronic device, the first motion sensor being mounted in a screen panel of the electronic device, the screen panel including an electrostatic sensor, the electrostatic sensor being configured to use a touchscreen of the screen panel as an electrode; and a processing unit coupled to the first motion sensor, the processing unit including: a non-transitory memory including a program; and a processor coupled to the non-transitory memory and configured to execute the program, the program including instructions to: determine a current activity of the touchscreen based on electrostatic sensor data received from the electrostatic sensor; and select an on-table detection algorithm to determine whether or not the electronic device is located on a stationary surface based on the first motion sensor data, where selecting the on-table detection algorithm is based on the current activity of the touchscreen.

Example 15. The system of example 14, where the on-table detection algorithm includes a decision tree.

Example 16. The system of one of examples 14 or 15, where the first motion sensor is configured to run the on-table detection algorithm as embedded logic.

Example 17. The system of one of examples 14 to 16, further including a second motion sensor configured to generate second motion sensor data indicative of a second type of movement of the electronic device, the second motion sensor being mounted in a keyboard panel of the electronic device.

Example 18. The system of example 17, where the program further includes instructions to determine a lid angle between the screen panel and the keyboard panel based on the first motion sensor data and the second motion sensor data, a screen angle between the screen panel and the vertical direction based on the first motion sensor data, and a keyboard angle between the keyboard panel and the vertical direction based on the second motion sensor data.

Example 19. The system of example 18, where the program further includes instructions to determine a device mode of the electronic device based on the lid angle, the screen angle, and the keyboard angle.

Example 20. The system of example 19, where selecting the on-table detection algorithm is further based on the current device mode of the electronic device.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method comprising:
receiving electrostatic sensor data from an electrostatic sensor in a processor of an electronic device, the electrostatic sensor being part of a motion sensor mounted behind a touchscreen, the motion sensor further comprising an accelerometer, the electrostatic sensor being configured to use the touchscreen as an electrode; and
determining, in the processor, when the touchscreen is being used from the electrostatic sensor data.

2. The method of claim 1, further comprising selecting an on-table detection algorithm from a plurality of available on-table detection algorithms based on whether the touchscreen is being used.

3. The method of claim 2, further comprising determining whether or not the electronic device is located on a stationary or stable surface by running the selected on-table detection algorithm.

4. The method of claim 3, wherein the selected on-table detection algorithm is run as program instructions in the motion sensor.

5. The method of claim 1, wherein determining when the touchscreen is being used further comprises filling a buffer with the electrostatic sensor data.

6. The method of claim 5, wherein determining when the touchscreen is being used further comprises:
computing a variance of the electrostatic sensor data stored in the buffer; and
comparing the variance with a threshold value.

7. The method of claim 6, wherein determining when the touchscreen is being used further comprises setting a touch flag based on the comparison of the variance with the threshold value.

8. A method comprising:
determining when a touchscreen is being used from electrostatic sensor data in a processor of an electronic device, the electrostatic sensor data being received from an electrostatic sensor, the electrostatic sensor being part of a first motion sensor mounted behind a touchscreen of the electronic device, the first motion sensor further comprising an accelerometer, the electrostatic sensor being configured to use the touchscreen as an electrode;
based on whether or not the touchscreen is being used, selecting an on-table detection algorithm from a plurality of available on-table detection algorithms; and
running the selected on-table detection algorithm in the first motion sensor, wherein the selected on-table detection algorithm determines whether or not the electronic device is located on a stationary or stable surface.

9. The method of claim 8, wherein determining when the touchscreen is being used from electrostatic sensor data in the processor of the electronic device comprises running a touch detection algorithm implemented in a processor.

10. The method of claim 9, wherein the touch detection algorithm comprises collecting data from the electrostatic sensor at a rate in a range of 120 Hz to 960 Hz.

11. The method of claim 10, wherein the touch detection algorithm further comprises subsampling data from the electrostatic sensor at a rate in a range of 30 Hz to 120 Hz.

12. The method of claim 9, wherein the touch detection algorithm comprises outputting an instant touch flag based on comparing features values from the electrostatic sensor data with threshold values.

13. The method of claim 12, wherein the touch detection algorithm further comprises outputting a touch flag with a value of "no-touch" at a start of running.

14. The method of claim 12, wherein the touch detection algorithm further comprises outputting a touch flag with a value of "touch" when the instant touch flag has a value of "touch" for a duration with a length in a range of 0.125 seconds to 8 seconds.

15. The method of claim 12, wherein the touch detection algorithm further comprises outputting a touch flag with a value of "no-touch" when the instant touch flag has a value of "no-touch" for a duration with a length in a range of 10 seconds.

16. A method comprising:
receiving motion sensor data in a processor of an electronic device, the motion sensor data being received from a first motion sensor and a second motion sensor, the first motion sensor being mounted in a touchscreen of the electronic device, the first motion sensor comprising an electrostatic sensor, the electrostatic sensor being configured to use the touchscreen as an electrode, and the second motion sensor being mounted in a keyboard panel of the electronic device;
determining a current device mode of the electronic device using the motion sensor data;
using electrostatic sensor data from the electrostatic sensor to determine when the touchscreen is being used; and
based on the current device mode and whether or not the touchscreen is being used, selecting an on-table detection algorithm from a plurality of available on-table detection algorithms.

17. The method of claim 16, further comprising running the selected on-table detection algorithm.

18. The method of claim 17, wherein the selected on-table detection algorithm determines whether or not the electronic device is located on a stationary surface.

19. The method of claim 17, wherein the selected on-table detection algorithm is executed as program instructions in the first motion sensor.

20. The method of claim 16, wherein the current device mode is a clamshell mode, a flat mode, a stand mode, a tent mode, a tablet mode, or a book mode.

* * * * *